United States Patent
McDonnell et al.

(10) Patent No.: US 10,917,222 B2
(45) Date of Patent: Feb. 9, 2021

(54) SIMULTANEOUS OPERATION OF MULTIPLE TIME DIVISION DUPLEX LINKS USING A SINGLE TRANSCEIVER

(71) Applicant: Apple Inc., Cupertino, CA (US)

(72) Inventors: Nicholas M. McDonnell, San Jose, CA (US); Hsin-Yuo Liu, Fremont, CA (US)

(73) Assignee: Apple Inc., Cupertino, CA (US)

( * ) Notice: Subject to any disclaimer, the term of this patent is extended or adjusted under 35 U.S.C. 154(b) by 203 days.

(21) Appl. No.: 14/503,280

(22) Filed: Sep. 30, 2014

(65) Prior Publication Data

US 2016/0095152 A1 Mar. 31, 2016

(51) Int. Cl.
*H04L 5/14* (2006.01)
*H04B 7/0413* (2017.01)
(Continued)

(52) U.S. Cl.
CPC ............ *H04L 5/14* (2013.01); *H04B 7/0413* (2013.01); *H04L 5/001* (2013.01); *H04W 84/042* (2013.01)

(58) Field of Classification Search
CPC ......... H04L 5/001; H04L 5/14; H04B 7/0413; H04W 84/042; H04W 76/025; H04W 84/027; H01Q 1/241
See application file for complete search history.

(56) References Cited

U.S. PATENT DOCUMENTS 8,934,460 B1 * 1/2015 Hu .................... H04W 72/1205
370/337
2008/0279125 A1 11/2008 Hottinen
(Continued)

FOREIGN PATENT DOCUMENTS

CN 103368622 A * 10/2013
EP 2725723 A1 4/2014
(Continued)

OTHER PUBLICATIONS

Liu, Mobile terminal and antenna switching method thereof, Jul. 9, 2015, whole document (EPO English translation of WO2015100526) (Year: 2015).*

(Continued)

*Primary Examiner* — Un C Cho
*Assistant Examiner* — Jose L Perez
(74) *Attorney, Agent, or Firm* — Dickinson Wright RLLP

(57) ABSTRACT

Apparatus and methods for performing simultaneous time division duplex (TDD) communications are disclosed. A wireless communication device can be configured to establish both a first TDD communication link and a second TDD communication link with a network, such as a telecommunication network. Thereafter, the wireless communication device can send TDD uplink data to the network via the first TDD communication link, and receive TDD downlink data from the network via the second TDD communication link, such that a portion of the TDD uplink data is sent to the network at the same time a portion of the TDD downlink data is received from the network. In this manner, the transmissions of TDD uplink data and the TDD downlink data can occur simultaneously, via multiple communication links. Further, the TDD downlink data can be received in multiple, coordinated data transmissions using Long Term Evolution (LTE) multiple-input and multiple-output (MIMO) antenna diversity.

14 Claims, 21 Drawing Sheets

(51) Int. Cl.
*H04L 5/00* (2006.01)
*H04W 84/04* (2009.01)

(56) References Cited

U.S. PATENT DOCUMENTS

| | | | |
|---|---|---|---|
| 2012/0140743 A1* | 6/2012 | Pelletier | H04W 72/0453 370/335 |
| 2012/0202561 A1* | 8/2012 | Robinett | H04B 1/006 455/552.1 |
| 2012/0207040 A1* | 8/2012 | Comsa | H04W 72/1215 370/252 |
| 2012/0236738 A1* | 9/2012 | Laurila | H04B 7/0825 370/252 |
| 2012/0264473 A1* | 10/2012 | Mujtaba | H04W 68/00 455/515 |
| 2012/0297070 A1* | 11/2012 | Shi | H04W 72/1215 709/226 |
| 2012/0314626 A1* | 12/2012 | Alapuranen | H04B 7/2615 370/280 |
| 2012/0327821 A1 | 12/2012 | Lin et al. | |
| 2013/0021954 A1* | 1/2013 | Montojo | H04W 72/048 370/295 |
| 2013/0083704 A1 | 4/2013 | Gaal et al. | |
| 2013/0094446 A1* | 4/2013 | Swaminathan | H04W 36/0022 370/328 |
| 2013/0115977 A1* | 5/2013 | Chandramouli | H04W 68/02 455/458 |
| 2013/0176913 A1* | 7/2013 | Niskanen | H04B 1/48 370/278 |
| 2013/0208587 A1* | 8/2013 | Bala | H04W 72/0446 370/230 |
| 2013/0301570 A1* | 11/2013 | Xu | H04L 5/0073 370/329 |
| 2014/0010125 A1 | 1/2014 | Tillman et al. | |
| 2014/0086173 A1* | 3/2014 | Sadeghi | H04L 5/003 370/329 |
| 2014/0274065 A1* | 9/2014 | Low | H04W 36/0022 455/437 |
| 2014/0308986 A1* | 10/2014 | Yang | H04W 88/06 455/552.1 |
| 2014/0328228 A1 | 11/2014 | Park et al. | |
| 2015/0105120 A1* | 4/2015 | Lim | H04W 36/0022 455/552.1 |
| 2015/0257027 A1* | 9/2015 | Bodduru | H04W 88/06 370/280 |
| 2015/0373667 A1* | 12/2015 | Rajurkar | H04W 68/12 455/458 |
| 2016/0255557 A1* | 9/2016 | Swaminathan et al. | H04W 36/14 370/217 |

FOREIGN PATENT DOCUMENTS

| | | |
|---|---|---|
| EP | 2784971 A1 | 10/2014 |
| JP | 2007082080 A | 3/2007 |
| JP | 2014504474 A | 2/2014 |
| JP | 2014517612 A | 7/2014 |
| JP | 2014519289 A | 8/2014 |
| JP | 2014529267 A | 10/2014 |
| WO | 2012138375 A1 | 10/2012 |
| WO | 2012170185 A1 | 12/2012 |
| WO | 2013105020 A1 | 7/2013 |
| WO | 2013143099 A1 | 10/2013 |
| WO | WO-2015100526 A1 * | 7/2015 |

OTHER PUBLICATIONS

Ma, Multimode dual standby terminal and antenna resource allocation method thereof, Oct. 23, 2013, whole document (EPO English translation of CN103368622) (Year: 2013).*
Liu, Mobile terminal and antenna switching method thereof, Jul. 9, 2015, whole document (Year: 2015).*
Sharp, "Uplink reporting for inter-band carrier aggregation with different TDD configuration", 3GPP TSG-RAN WG #66 discussion document RI-113345, Oct. 10-14, 2011. Sections 1 and 4.
Potevio, "Support of different TDD UL-DL configuration on different bands", 3GPP TSG TAN WGI Meeting #66, discussion document RI-112579, Aug. 22-26, 2011.
UK Patent Application No. GB1513885.2—Search and Examination Report dated Mar. 1, 2016.
Japanese Patent Application No. 2015-158467—Office Action dated Aug. 22, 2016.
Chinese Application for Invention No. 201510587308.5—Second Office Action dated Sep. 13, 2018.
Chinese Application for Invention No. 201510587308.5—First Office Action dated Feb. 6, 2018.

* cited by examiner

SIMULTANEOUS OPERATION OF MULTIPLE TIME DIVISION DUPLEX LINKS USING A SINGLE TRANSCEIVER

FIELD

The described embodiments generally relate to wireless communications, and more particularly, to apparatus and methods for efficiently transmitting synchronous data within time division duplex (TDD) telecommunication networks.

BACKGROUND

In digital communications, time division duplexing (TDD) typically emulates full-duplex communication over a half-duplex communication link, where uplink (UL) and downlink (DL) communications can be transmitted at different times, in a coordinated manner. Some telecommunication radio access technologies (RATs) that support TDD include devices and technologies that are compatible with Global System for Mobile (GSM) communications, Universal Mobile Telecommunications Systems (UMTS), Code Division Multiple Access (CDMA), Long Term Evolution (LTE), and extensions, advancements, or derivations thereof. Regardless of a selected RAT deployment, TDD bit stream communications occur within sequential data frames having individual, alternating time slots that can be scheduled for UL or DL data transmissions using the same frequency resource.

More recently, TD-LTE (i.e., TDD LTE) was standardized by an international coalition of companies, in an effort to migrate time division synchronous code division multiple access (TD-SCDMA, developed in the People's Republic of China) RATs to fourth generation (4G) LTE, as specified by the third generation partnership project (3GPP). Modern LTE protocols support frequency division duplexing (FDD) using paired spectrum and TDD using unpaired spectrum. Dual-mode mobile devices are being developed to support both FDD and TDD within a single RAT. However, mobile devices are presently limited to performing TDD operations using a single RAT per device transceiver, without performing time division switching operations between RATs, a procedure which is not "simultaneous" by definition.

Accordingly, there remains a need for developing technologies that support simultaneous TDD transmissions across multiple RATs at a mobile device that is configured with a single transceiver. Further, it would be beneficial if TD-LTE technologies were developed to support carrier aggregation in the time domain for similar devices using multiple TDD communication links. Numerous communication scenarios exist that would benefit from these technological advancements, some of which are described further herein.

SUMMARY

Various embodiments disclosed herein provide for apparatus and methods that perform simultaneous time division duplex (TDD) communications. In accordance with some scenarios, a procedure can be performed at a wireless communication device, e.g., a mobile device, which includes, but is not limited to including, establishing a first TDD communication link and a second TDD communication link with a network, e.g., a telecommunication network. In some scenarios, the first TDD communication link may be established with the network before, after, or at the same time that the second TDD communication link is established with the network, depending on various network and/or device communication considerations. Thereafter, TDD uplink (UL) data can be sent to the network via the first TDD communication link or the second TDD communication link, and TDD downlink (DL) data can be received from the network via the first TDD communication link or the second TDD communication link.

In some configurations, a portion of (a subset of, or all of) the TDD UL data may be transmitted from the mobile device to the network at the same time a portion of (a subset of, or all of) the TDD DL data can be received at the mobile device from the network, via different communication links, i.e., either via the first TDD communication link or via the second TDD communication link. In this instance, the transmission of TDD UL data can occur simultaneously with the transmission of TDD DL data, by utilizing multiple TDD communication links for the corresponding TDD communications, e.g., at the same time.

In accordance with one aspect, the TDD DL data can be received at a mobile device in multiple, coordinated data transmissions using Long Term Evolution (LTE) multiple-input and multiple-output (MIMO) antenna diversity. For example, in some configurations, a mobile device may be configured with multiple antennas, and the TDD DL data can include both a first time division Long Term Evolution (TD-LTE) data transmission and a second TD-LTE data transmission. In such an arrangement, the mobile device may receive the first TD-LTE data transmission at a first antenna of the multiple antennas via the first TDD communication link, and the mobile device can also receive the second TD-LTE data transmission at a second antenna of the multiple antennas via the first TDD communication link, e.g., at the same time.

In some aspects, the TDD UL data may include a TD-LTE data transmission or a time division Synchronous Code Division Multiple Access (TD-SCDMA) data transmission, and the mobile device can further send the TDD UL data from a third antenna of the multiple antennas via the second TDD communication link, at the same time the mobile device receives both the first TD-LTE data transmission and the second TD-LTE data transmission.

In accordance with some scenarios, the TDD DL data may be a Global System for Mobile (GSM) paging communication that is received via the second TDD communication link, and the TDD UL data may be a TD-LTE communication that is sent via the first TDD communication link. In this arrangement, the mobile device can establish a GSM voice call via the second TDD communication link in response to receiving the GSM paging communication, and the mobile device can discontinue the TD-LTE communication via the first TDD communication link during the GSM voice call, when technologically necessary, e.g., based on a mobile device's hardware and firmware capability.

In accordance with various aspects, the TDD DL data may include a first TD-LTE data transmission and a second TD-LTE data transmission, and the TDD UL data may include a third TD-LTE data transmission. In this configuration, the mobile device can receive the first TD-LTE data transmission and the second TD-LTE data transmission via the first TDD communication link, and send the third TD-LTE data transmission via the second TDD communication link, e.g., at the same time.

In some configurations, in response to a TDD switching operation, e.g., during subsequent, consecutive TD-LTE time slots on the DL and on the UL, the mobile device can receive the first TD-LTE data transmission and the second TD-LTE data transmission via the second TDD communication link, and send the third TD-LTE data transmission via the first TDD communication link. As would be understood by those having ordinary skill in the art, this configuration can enable carrier aggregation in the time domain for TD-LTE compliant wireless communication devices.

In one scenario, a wireless communication device may be configured with a radio transceiver that supports simultaneous TDD communications using multiple TDD communication links, one or more processors, and a storage device storing computer-executable instructions. In this arrangement, the one or more processors may execute the computer-executable instructions to cause the wireless communication device to establish a first TDD communication link and a second TDD communication link with a network, send TDD UL data to the network via the first TDD communication link, and then receive TDD DL data from the network via the second TDD communication link. The TDD UL data (or a portion thereof) can be transmitted from the wireless communication device at the same time the TDD DL data (or a portion thereof) is received at the wireless communication device, using similar TDD time slot resources of the first TDD communication link and the second TDD communication link.

In accordance with various aspects, the first TDD communication link may be established using a first radio communication channel and the second TDD communication link may be established using a second radio communication channel having different assigned radio frequency spectrum than the first radio communication channel.

In some configurations, the TDD DL data may be a Global System for Mobile (GSM) paging communication that is received via the second TDD communication link, and the execution of the computer-executable instructions by the one or more processors can cause the wireless communication device to establish a GSM voice call via the second TDD communication link in response to receiving the GSM paging communication.

In accordance with another scenario, a non-transitory storage device can store computer-executable instructions that, when executed by one or more processors of the wireless communication device, causes a wireless communication device to establish a first TDD communication link and a second TDD communication link with a network, send TDD UL data to the network via the first TDD communication link, and receive TD-LTE downlink data from the network via the second TDD communication link. In this configuration, a portion of (a subset of, or all of) the TDD UL data may be transmitted from the wireless communication device at the same time a portion of (a subset of, or all of) the TD-LTE DL data is received at the wireless communication device, via different TDD communication links.

In various configurations, the TD-LTE DL data may be received in multiple coordinated data transmissions using LTE MIMO antenna diversity.

In accordance some aspects of the disclosure, the TDD UL data can include a TD-LTE data transmission or a TD-SCDMA data transmission. Further, the TD-LTE DL data may include a first TD-LTE data transmission and a second TD-LTE data transmission, and the TDD UL data may include a third TD-LTE data transmission. In this arrangement, the execution of the computer-executable instructions can cause the wireless communication device to receive the first TD-LTE data transmission and the second TD-LTE data transmission via the first TDD communication link, and send the third TD-LTE data transmission via the second TDD communication link, e.g., at the same time.

Thereafter, and in response to a TDD switching operation, the execution of the computer-executable instructions can cause the wireless communication device to receive the first TD-LTE data transmission and the second TD-LTE data transmission via the second TDD communication link, and send the third TD-LTE data transmission via the first TDD communication link, e.g., at the same time.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The described embodiments, and the attendant advantages thereof, may best be understood by referencing the corresponding description for the figures identified below, in conjunction with the illustrations in the accompanying drawings. The subject matter depicted in the drawings, is included solely for illustrative purposes, and is in no way intended to overly limit the scope or meaning of this disclosure. As such, it should be understood that various changes in form and detail can be made to the drawings, as would be anticipated by those having ordinary skill in the art, and such modification would not depart from the spirit and scope of the corresponding disclosure.

DETAILED DESCRIPTION

Figure 1:
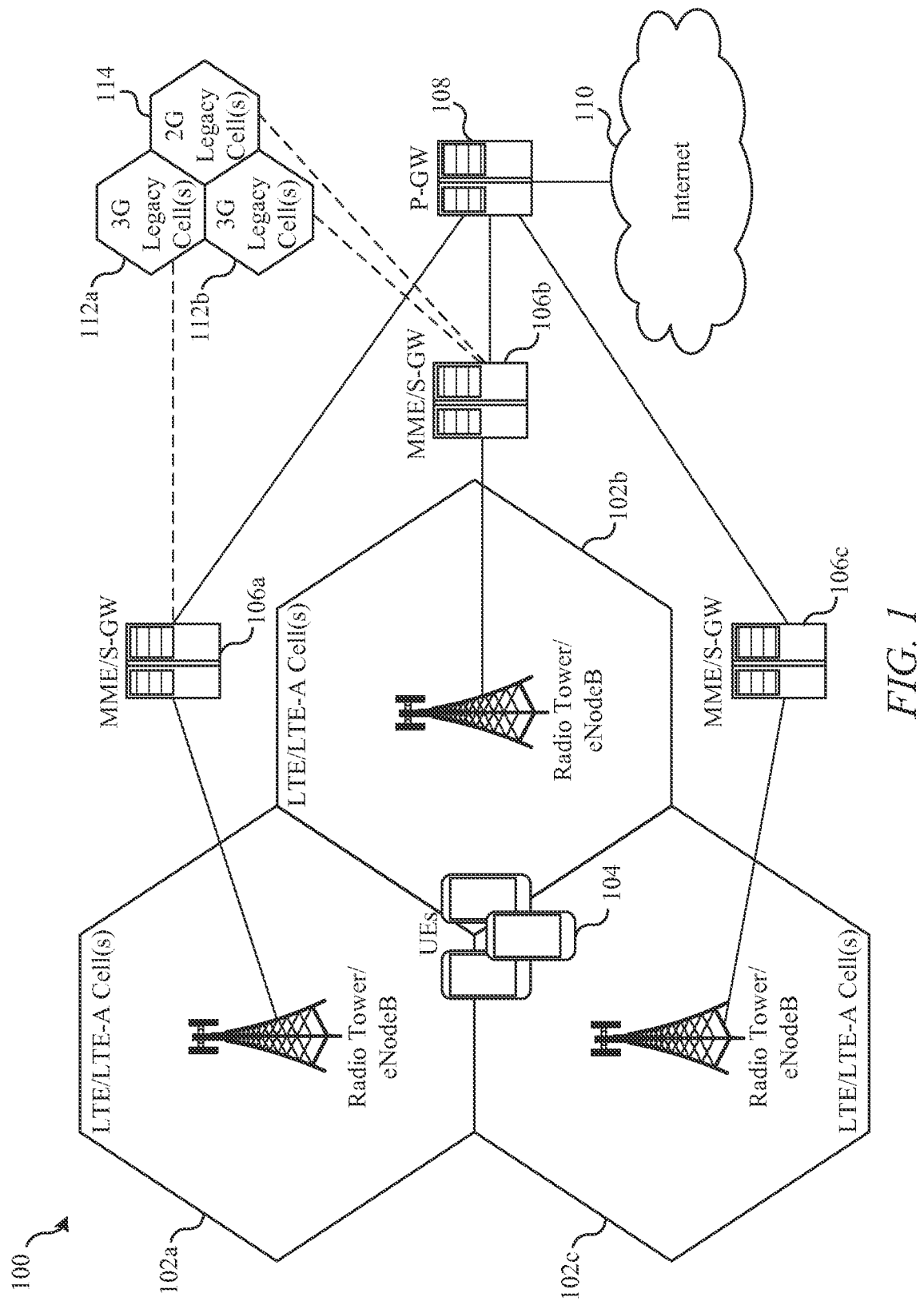
FIG. 1 illustrates a heterogeneous Long Term Evolution (LTE) wireless communication system, in accordance with some embodiments of the disclosure.

Representative examples for implementing simultaneous operation of multiple time division duplex (TDD) communication links at a single-transceiver device are described within this section. Additionally, various examples for performing legacy TDD paging operations during TDD data transmissions and time division Long Term Evolution (TD-LTE) multiple-input and multiple-output (MIMO) based data transmissions, including TD-LTE carrier aggregation communications, are also described herein. These examples are provided to add context to, and to aid in the understanding of, the cumulative subject matter of this disclosure. It should be apparent to one having ordinary skill in the art that the present disclosure may be practiced with or without some of the specific details described herein. Further, various modifications or alterations can be made to the subject matter described herein, and illustrated in the corresponding figures, to achieve similar advantages and results, without departing from the spirit and scope of the disclosure.

Further, references are made in this section to the accompanying figures, which form a part of the disclosure and in which are shown, by way of illustration, various implementations corresponding to the described embodiments herein. Although the embodiments and scenarios of this disclosure are described in sufficient detail to enable one having ordinary skill in the art to practice the described implementations, it should be understood that these examples are not to be construed as being overly-limiting or all-inclusive.

In accordance with various embodiments described herein, the terms "wireless communication device," "wireless device," "mobile device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology.

In various implementations, a UE that is compliant with multiple, different communication protocols (e.g., including various TDD communication protocols) can operate as a multi-mode device by communicating within a 4G network cell employing any common type of LTE or LTE-A radio access technology (RAT), as well as within a 3G or 2G network cell employing any common type of legacy RAT. In some scenarios, a corresponding multi-mode communication device can be configured to prefer attachment to an LTE network offering faster data rate throughput, as compared to other 3G or 2G legacy networks offering lower data rate throughput. In other scenarios, a mobile device may be configured to communicate with any conceivable mixture of 4G, 3G, and 2G network RATs at the same time or in a time-varying manner.

As will be described in further detail, in some embodiments, a TDD-compliant wireless communication device may be able to conduct more than one data transmission at a time using different radio communication channel resources that can be associated with different TDD RAT types. By way of example, in some embodiments, different TDD RAT types may include devices and technologies that are compatible with TD-LTE, time division Synchronous Code Division Multiple Access (TD-SCDMA), Global System for Mobile (GSM), Enhanced Data rates for GSM Evolution (EDGE), etc. Further, in various implementations, a TDD-compliant mobile device may be configured to simultaneously utilize multiple TDD communication channels corresponding to the same RAT type, to support carrier aggregation in the time domain. This adaptation is particularly beneficial for TD-LTE devices, which have a MIMO antenna diversity requirement on the downlink (DL).

For example, two or more antennas are required at a TD-LTE compliant UE for the UE to be able to receive multi-path MIMO DL communications (e.g., by employing spatial multiplexing techniques) from a network base station, i.e., an enhanced NodeB (eNodeB), such that a DL throughput requirement associated with the LTE telecommunication standard can be theoretically achieved. In this regard, a mobile device must utilize at least two of its antennas at the same time (e.g., during the same time slot resources) to cumulatively receive LTE DL data (e.g., downlink shared channel (DL-SCH) data) in the time domain. Accordingly, in some embodiments, a TD-LTE wireless communication device may be configured with two, three, or four antennas to support various MIMO spatial multiplexing communication techniques. It should be understood that the TD-LTE mobile devices described herein are not limited to being configured with only four antennas; in various implementations TD-LTE UEs may have more than four antennas to support increased data throughput rates and/or improved wireless data communication redundancy.

FIG. 1 depicts a heterogeneous wireless communication system 100 that is compliant with the 3GPP Evolved Universal Terrestrial Radio Access (E-UTRA) air interface, and includes, but is not limited to including, multiple LTE and/or LTE-A network cells 102a-c respectively having at least one eNodeB network base station. In various network arrangements, the eNodeB base stations of the LTE/LTE-A cells 102a-c can be configured to communicate between and amongst each other using an LTE-X2 interface(s). Further, the E-UTRA compliant communication system 100 can include any number of mobility management entities (MMEs) and serving gateways (S-GWs) 106a-c, PDN gateways (P-GWs) 108, etc., which, as part of the evolved packet core (EPC), can communicate with any of the LTE/LTE-A cell 102a-c eNodeBs using an LTE-S1 interface(s).

In various embodiments, the heterogeneous system 100 may also be compliant with any number of 3G or 2G air interfaces, and as such, the system 100 can include any number of 3G legacy network cells 112a-b, as well as any number 2G legacy network cells 114. Additionally, the heterogeneous wireless communication system 100 may include multiple UEs 104 that can be respectively provided wireless telecommunication service by any of the LTE/LTE-A network cells 102a-c, as well as by any of the 3G or 2G legacy network cells, 112a-b and 114, at any particular time, based in part on a corresponding UE's 104 geographic location within the heterogeneous wireless communication system 100.

By way of example, a TD-LTE compliant UE 104 may be located within an LTE/LTE-A network cell 102a when the UE 104 initiates an Internet Protocol (IP) data download. The UE 104 can thereby establish communications with a serving TD-LTE eNodeB within its LTE/LTE-A network cell 102a. Then, the corresponding eNodeB can coordinate a data transfer through the EPC, 106a-c and 108, from the Internet 110 to allow the TD-LTE compliant UE 104 to download the requested packet-based IP data. In various implementations, the data transmitted from the eNodeB of LTE/LTE-A cell 102a to the UE 104 is transmitted over an LTE-Uu interface, and this data may be transmitted using MIMO spatial multiplexing techniques, such that multiple radio frequency (RF) chains associated with multiple DL data streams can be communicated to the UE via the same TDD communication link, at the same time.

Figure 2:
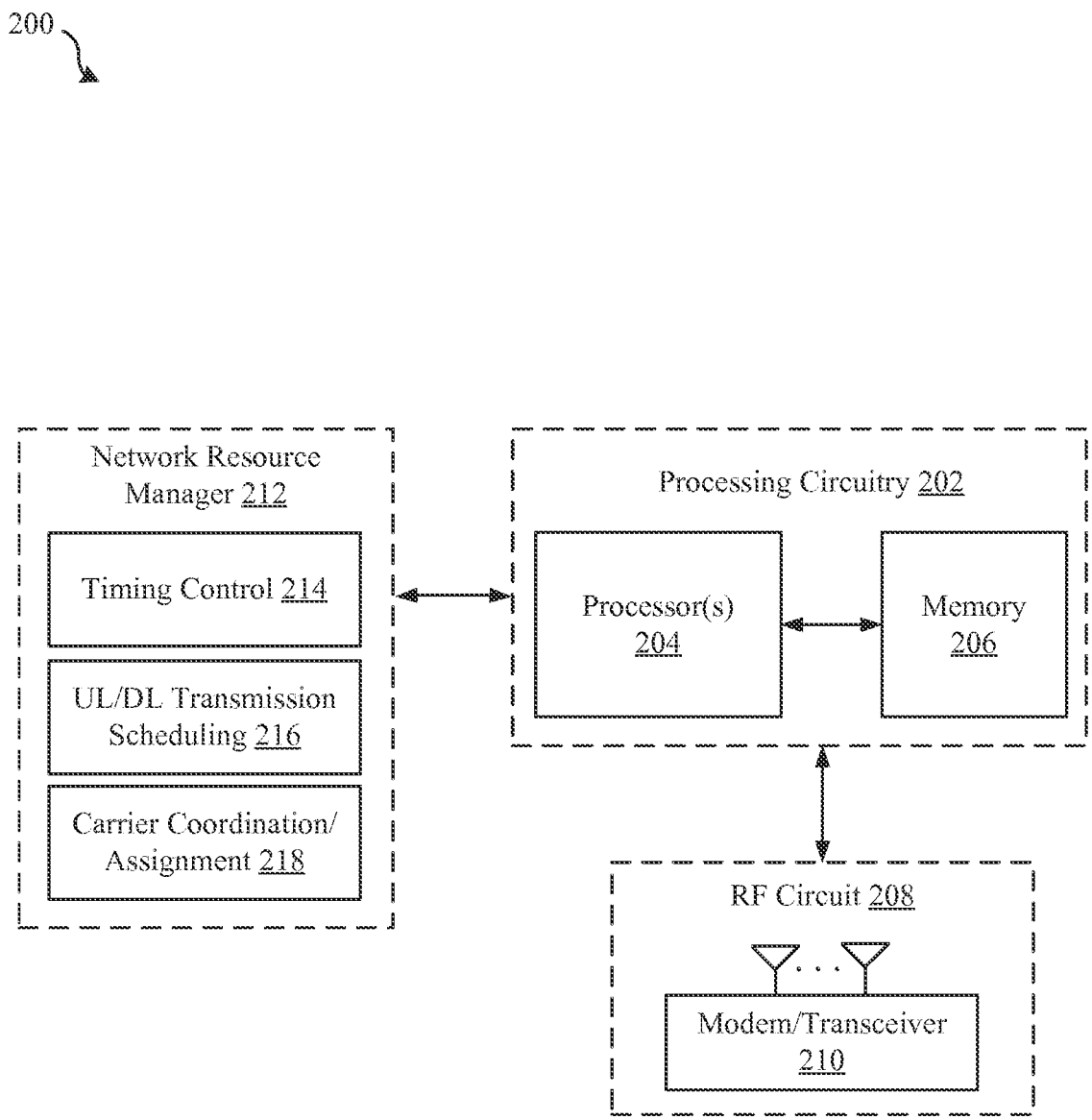
FIG. 2 depicts a block diagram of a network apparatus, in accordance with various embodiments of the disclosure.

FIG. 2 depicts a block diagram of a network apparatus 200 (e.g., an eNodeB, a NodeB, or another common type of network entity), in accordance with various embodiments of the disclosure. In various implementations, the network apparatus 200 may be configured with a network resource manager 212 having a timing control component 214, a UL/DL transmission scheduling component 216, and optionally, a carrier coordination/assignment component 218 that can be employed by the network apparatus 200 in various carrier aggregation arrangements, described further herein with respect to FIGS. 9a-c. In some configurations, the network apparatus 200 may utilize the timing controller component 214 of its network resource manager 212 to coordinate time slot assignments while scheduling data transmissions for multiple TDD communication links.

In various embodiments, the network apparatus 200 may employ the UL/DL transmission scheduling component 216 of its network resource manager 212 to schedule TDD data transmissions over sequential TDD data frames that have individual, alternating time slots. As will be described further herein with respect to FIGS. 5, 6c, 7c, 8c and 9c, these TDD time slots can be allocated for alternating DL and UL data transmissions using the same frequency resource on the same TDD communication link. Additionally, the UL/DL transmission scheduling component 216 of the network resource manager 212 may also be configured to schedule the TDD time slots of multiple TDD communication links, in such a manner that multiple TDD communications can occur at the same time for a designated wireless communication device (e.g., to communicate with a UE using two TDD links, simultaneously).

In some configurations, the network apparatus 200 (e.g., an eNodeB) may include processing circuitry 202 that can perform various TDD scheduling actions, in accordance with one or more embodiments disclosed herein. In this regard, the processing circuitry 202 can be configured to perform and/or control performance of one or more functionalities of the network apparatus 200 in accordance with various embodiments, and thus, the processing circuitry 202 can perform various network resource and communication scheduling procedures of the network apparatus 200 in accordance with various implementations of the disclosure. The processing circuitry 202 may further be configured to perform data processing, application execution and/or other control and management functions according to one or more embodiments of the disclosure.

The network apparatus 200, or portions or components thereof, such as the processing circuitry 202, may also include one or more chipsets that can respectively include any number of coupled microchips thereon. The processing circuitry 202 and/or one or more other components of the network apparatus 200 may also be configured to implement functions associated with various TDD communication link scheduling procedures and TDD communications using its multiple chipsets. In some embodiments, the network apparatus 200 may be associated with, or employed as, an eNodeB of an LTE/LTE-A network cell 102a-c to operate within the heterogeneous wireless communication system 100 of FIG. 1. In this arrangement, the network apparatus 200 may include one or more chipsets configured to enable the network apparatus 200 to operate within the heterogeneous system 100 as a network base station, providing wireless communications service to any number of UEs 104 located within its corresponding wireless coverage area(s) (e.g., coverage areas associated with the LTE/LTE-A network cells 102a-c).

In some configurations, the processing circuitry 202 of the network apparatus 200 may include one or more processor(s) 204 and a memory component 206. Further, the processing circuitry 202 may be in communication with, or otherwise coupled to, a radio frequency (RF) circuit 208 having a TDD compliant modem and one or more wireless communication transceivers 210. In various implementations, the RF circuit 208 including the modem and the one or more transceivers 210 may be configured to communicate using different TDD RAT types. For instance, in some embodiments the RF circuit 208 may be configured to communicate using an LTE RAT, and in other embodiments, the RF circuit 208 may be configured to communicate using a TD-SCDMA RAT, an EDGE RAT, a GSM RAT, or any other TDD RAT type.

In various implementations, the processor(s) 204 may be configured and/or employed in a variety of different forms. For example, the processor(s) 204 may be associated with any number of microprocessors, co-processors, controllers, or various other computing or processing implements, including integrated circuits such as, for example, an application specific integrated circuit (ASIC), a field programmable gate array (FPGA), or any combination thereof. In various arrangements, multiple processors 204 can be coupled to and/or configured in operative communication with each other, and these hardware components may be collectively configured to perform one or more procedures of the network apparatus 200 as described herein, in the form of an eNodeB, a MME, or another network entity having corresponding control capability.

In some scenarios, the processor(s) 204 can be configured to execute instructions (e.g., computer-executable instructions) that may be stored in the memory 206, or that is otherwise accessible to the processor(s) 204 at some other device storage location. As such, whether configured as, or in conjunction with, hardware or a combination of hardware and software, the processor(s) 204 of the processing circuitry 202 may be capable of performing TDD communication operations according to various embodiments described herein, when configured accordingly.

In some implementations, the memory 206 of the processing circuitry 202 may include multiple memory devices that can be associated with any common volatile or non-volatile memory type. In some scenarios, the memory 206 may be associated with a non-transitory computer-readable storage medium that can store various computer program instructions which may be executed by the processor(s) 204 during normal firmware or application executions. In this regard, the memory 206 can be configured to store information, data, applications, instructions, or the like, for enabling the network apparatus 200 to carry out various TDD communication functions in accordance with one or more embodiments of the disclosure. In some configurations, the memory 206 may be in communication with, and coupled to, the processor(s) 204 of the processing circuitry 202, as well as to one or more system buses for passing information between and amongst the different device components of the network apparatus 200.

It should be appreciated that not all of the components, device elements, and hardware illustrated in, and described with respect to, the network apparatus 200 of FIG. 2 may be essential to this disclosure, and thus, some of these items may be omitted, consolidated, or otherwise modified within reason. Additionally, in some implementations, the subject matter associated with the network apparatus 200 can be configured to include additional or substitute components, device elements, or hardware, beyond those that are shown within FIG. 2.

Figure 3:
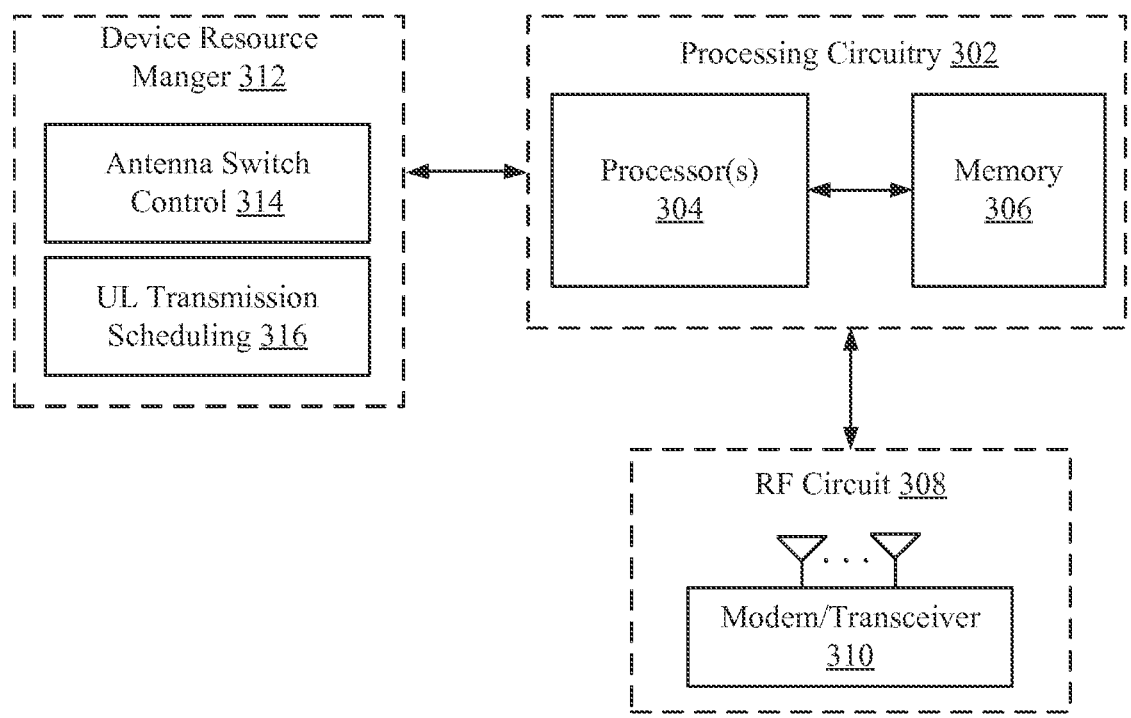
FIG. 3 illustrates a block diagram of a mobile device, in accordance with some embodiments of the disclosure.

FIG. 3 illustrates a block diagram of a wireless communication device 300 (e.g., a TDD compliant UE), having an RF circuit 308 with a transceiver and a TDD compliant modem 310, as well as, a device resource manager 312 including an antenna switch control component 314 and an UL transmission scheduling component 316, in accordance with some embodiments of the disclosure. In various configurations, the wireless communication device 300 may include processing circuitry 302 that can perform various TDD communication operations, described further herein with respect to FIGS. 6a-13. In some embodiments, the processing circuitry 302 can employ the antenna switch control component 314 of its device resource manager 312 to switch between multiple antennas (e.g., two, three, or four antennas) to transmit (Tx) and/or receive (Rx) various TDD communications on the UL or the DL.

However, it should be understood that this antenna switching functionality may likewise be incorporated within the RF circuit 308 of the mobile device 300, in any particular arrangement, without departing from the spirit and scope of the disclosure. Further, the processing circuitry 302 of the wireless communication device 300 can be configured to employ the UL transmission scheduling component 316 of its device resource manager 312 to perform various UL TDD data transmissions over one or more TDD communication link(s), in coordination with various DL TDD data transmissions that can be scheduled at a corresponding network apparatus 200 (e.g., via the UL/DL transmission scheduling component 216 of the network resource manager 212).

In some embodiments, the wireless communication device 300 (e.g., a TD-LTE compliant UE) may include processing circuitry 302 that can perform various TDD communications, in accordance with various device configurations disclosed herein. In this regard, the processing circuitry 302 can be configured to perform and/or control performance of one or more functionalities of the wireless communication device 300, and thus, the processing circuitry 302 can perform various antenna switching (e.g., via the antenna switch control component 314) and TDD data communication procedures of the wireless communication device 300, optionally, in collaboration with instructions or feedback from the network apparatus 200. The processing circuitry 302 may further be configured to perform data processing, application execution and/or other control and management functions according to one or more embodiments of the disclosure.

The wireless communication device 300, or portions or components thereof, such as the processing circuitry 302, may also include one or more chipsets that can respectively include any number of coupled microchips thereon. The processing circuitry 302 and/or one or more other components of the wireless communication device 300 may also be configured to implement functions associated with various TDD communication link data transmissions using its multiple chipsets. Additionally, in some embodiments, the wireless communication device 300 may be associated with a multi-mode, TD-LTE compliant UE 104 that is configured to operate within the heterogeneous wireless communication system 100 of FIG. 1. In this arrangement, the wireless communication device 300 may include one or more chipsets configured to enable the mobile device 300 to operate within its corresponding wireless coverage area (e.g., within a coverage area associated with an LTE/LTE-A network cell(s) 102a-c).

In some configurations, the processing circuitry 302 of the wireless communication device 300 may include one or more processor(s) 304 and a memory component 306. In various implementations, the RF circuit 308, including a modem and a single transceiver, may be configured to communicate using different TDD RAT types. For example, in some embodiments, the RF circuit 308 may be configured to communicate using an LTE RAT, and in other embodiments, the RF circuit 308 may be configured to communicate using a TD-SCDMA RAT, an EDGE RAT, a GSM RAT, or any other TDD RAT type. It should be understood that being able to perform communications using multiple TDD RATs qualify the wireless communication device 300 as a multi-mode communication device.

In various implementations, the processor(s) 304 may be configured and/or employed in a variety of different forms. For example, the processor(s) 304 may be associated with any number of microprocessors, co-processors, controllers, or various other computing or processing implements, including integrated circuits such as, for example, an application specific integrated circuit (ASIC), a field programmable gate array (FPGA), or any combination thereof. In various arrangements, multiple processors 304 can be coupled to and/or configured in operative communication with each other, and these hardware components may be collectively configured to perform one or more procedures of the wireless communication device 300, as described herein, in the form of TDD compliant multi-mode communication device.

In some scenarios, the processor(s) 304 can be configured to execute instructions (e.g., computer-executable instructions) that may be stored in the memory 306, or that is otherwise accessible to the processor(s) 304 at some other device storage location. As such, whether configured as, or in conjunction with, hardware or a combination of hardware and software, the processor(s) 304 of the processing circuitry 302 may be capable of performing TDD communication operations according to various embodiments described herein, when configured accordingly.

In some implementations, the memory 306 of the processing circuitry 302 may include multiple memory devices that can be associated with any common volatile or non-volatile memory type. In some scenarios, the memory 306 may be associated with a non-transitory computer-readable storage medium that can store various computer program instructions which may be executed by the processor(s) 304 during normal firmware or application executions. In this regard, the memory 306 can be configured to store information, data, applications, instructions, or the like, for enabling the wireless communication device 300 to carry out various TDD communication functions in accordance with one or more embodiments of the disclosure. In some configurations, the memory 306 may be in communication with, and coupled to, the processor(s) 304 of the processing circuitry 302, as well as to one or more system buses for passing information between and amongst the different device components of the wireless communication device 300.

It should be appreciated that not all of the components, device elements, and hardware illustrated in, and described with respect to, the wireless communication device 300 of FIG. 3 may be essential to this disclosure, and thus, some of these items may be omitted, consolidated, or otherwise modified within reason. Additionally, in some implementations, the subject matter associated with the wireless communication device 300 can be configured to include additional or substitute components, device elements, or hardware, beyond those that are shown within FIG. 3.

Figure 4:
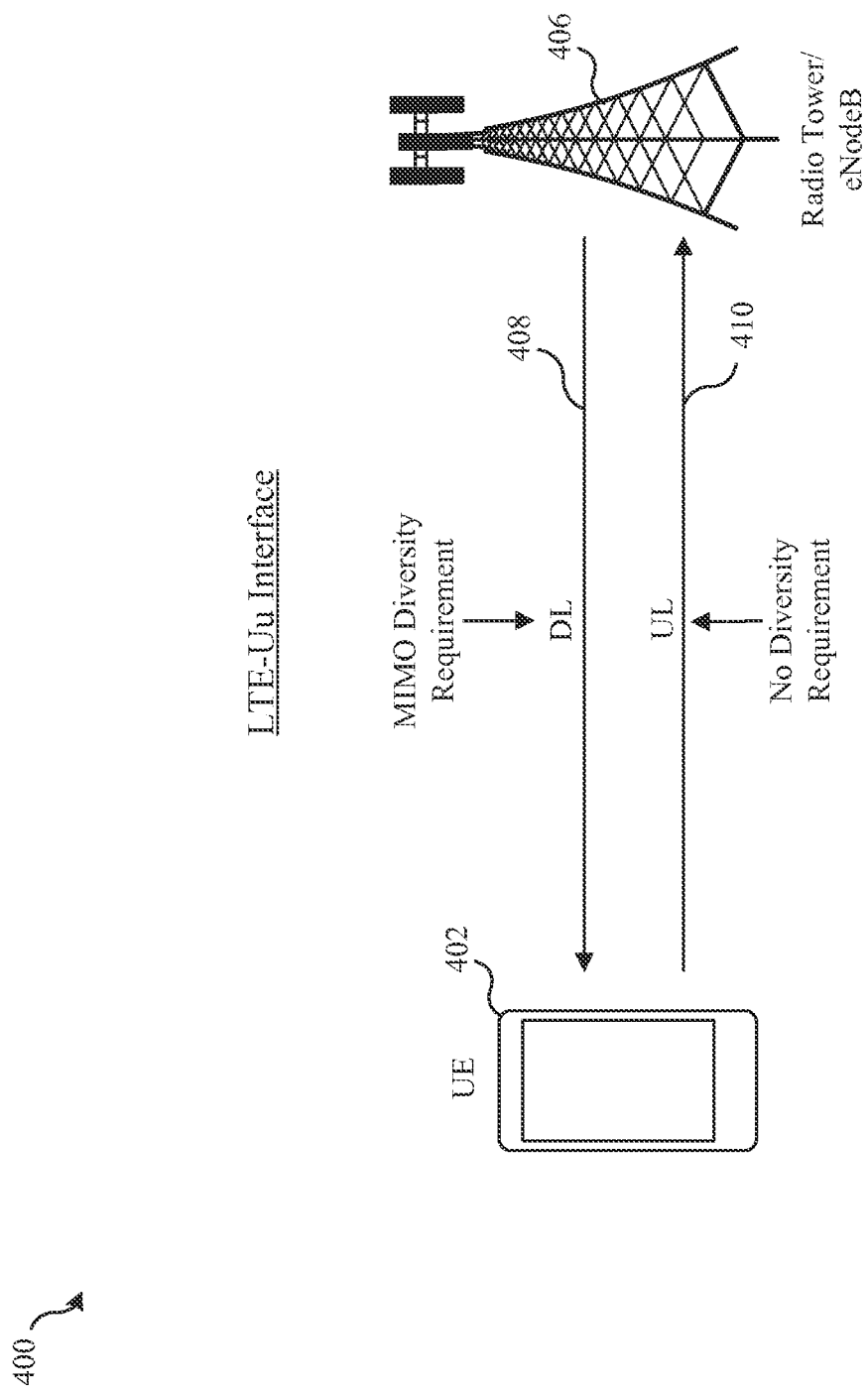
FIG. 4 depicts an LTE-Uu Interface, in accordance with various embodiments of the disclosure.

FIG. 4 depicts an LTE-Uu interface 400 between a network apparatus 406 (e.g., an eNodeB) and a wireless communication device 402 (e.g., a TD-LTE compliant UE), in accordance with various embodiments of the disclosure. By way of example, in some implementations, the network apparatus 406 (corresponding to the network apparatus of 200 of FIG. 2) may schedule one or more TDD DL data transmission(s) for a UE 402 (corresponding to the wireless communication device 300 of FIG. 3) using a first TDD communication link 408, at the same time one or more TDD UL data transmission(s) are scheduled for the same UE 402 using a second TDD communication link 410. In accordance with various embodiments, the first TDD communication link 408 and the second TDD communication link 410 may correspond to/utilize different radio communication channels.

In this arrangement, multiple TDD data transmissions (for both UL and DL data) can occur at the same time using different TDD RAT types. As such, it should be understood that the network apparatus 406 may have multiple air interfaces, one of which can be associated with an E-UTRA air interface for the LTE telecommunication standard (as shown in FIG. 4). In this implementation, the network apparatus 406 may be configured to support MIMO-based spatial multiplexing so that DL data transmissions comply with the LTE MIMO diversity requirement, as understood by those skilled in the art. By way of example, in some embodiments, a UE 402 can be configured with three or more antennas, and the UE 402 may be able to receive multiple MIMO DL data transmissions from the network apparatus 406 using two antennas, at the same time the UE 402 transmits an independent UL data transmission using a third antenna. However, it should be understood that numerous alternative antenna configurations can be employed at the UE 402 without departing from the spirit and scope of the disclosure.

Figure 5:
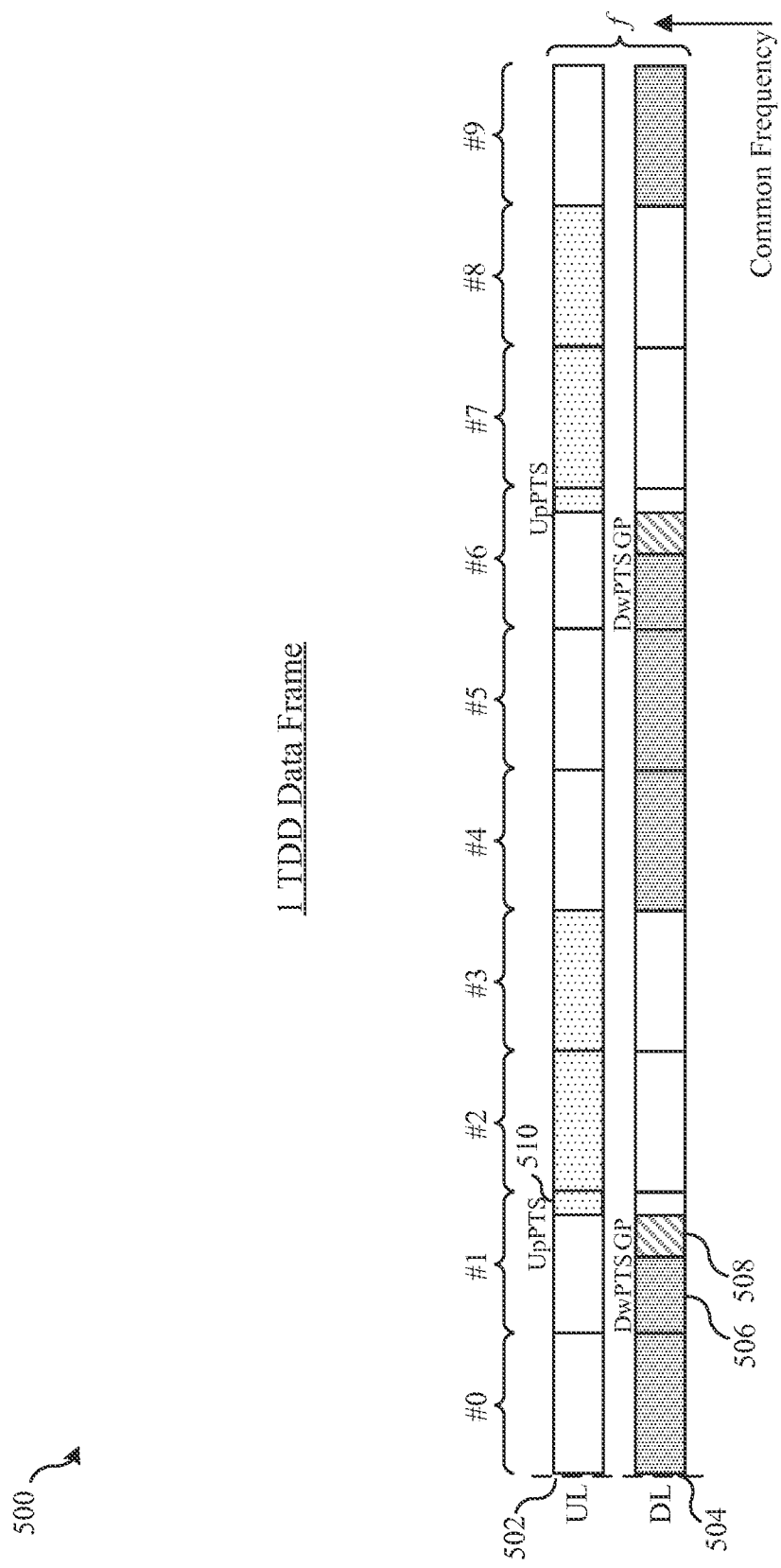
FIG. 5 illustrates a diagram of a single Time Division Duplex (TDD) data frame for the uplink (UL) and the downlink (DL), in accordance with some embodiments of the disclosure.

FIG. 5 illustrates a diagram of a single TDD data frame 500 (e.g., a TD-LTE data frame) for both the UL 502 and the DL 504, in accordance with some embodiments of the disclosure. As depicted in FIG. 5, a TDD data frame 500 consists of ten independent subframes, labeled from #0 through #9. The time duration of a standard TDD data frame 500 lasts for 10 milliseconds (ms), and as such, each subframe within a TDD data frame 500 has a transmission time interval (TTI) duration that lasts for 1 ms. Similar to frequency division duplex (FDD) data frame subframes, each TDD data frame subframe consists of two time slots having time durations of 0.5 ms each. In TD-LTE, subframes #0 and #5 are always allocated for DL transmissions, and subframes #1 and #6 are always used for synchronization between the DL 504 and the UL 502. These subframes are considered to be "special subframes." The remaining subframes, #2, #3, #4, #7, #8, and #9, are considered to be variable/allocatable subframes for scheduling purposes.

Further, a TD-LTE data frame 500 can be configured with one or two switching points or special subframe(s) for switching from the DL 504 to the UL 502, in a coordinated manner. In this regard, some TD-LTE data frames 500 have a 5 ms switch-point periodicity, whereas other TD-LTE data frames are configured with a 10 ms switch-point periodicity, depending on a particular LTE RAT implementation. In TD-LTE communications, the same carrier frequency is used for DL 504 and UL 502 communications, and as such, both the network apparatus 200 (e.g., an eNodeB) and the wireless communication device 300 (e.g., a TD-LTE compliant UE) must periodically, and collaboratively, switch from Tx to Rx, and vice versa (from Rx to Tx), in a time-varying manner. However, it should be understood that two distinct TDD communication links can be configured to operate using different carrier frequencies corresponding to the same RAT or different RAT types. Various applications of this principal are elucidated further herein.

The special subframe of a TD-LTE data frame 500 is divided into three parts, consisting of a downlink part (DwPTS) 506, a guard period (GP) 508, and an uplink part (UpPTS) 510. The DwPTS 506 acts as a normal downlink subframe with the exception that the DwPTS 506 has a reduced time duration (less than 1 ms), as compared to a normal subframe. The UpPTS 510 may be utilized for channel sounding or random access procedures, but not for UL data transmissions, due to the short time duration of the UpPTS 510 (which is substantially less than 1 ms). This reduced time allocation effectively provides the coordinated time resources that are necessary for the GP 508 and the UpPTS 510. During the GP 508 neither UL nor DL data transmissions can occur, as a physical device (e.g., a network apparatus 200 or a mobile device 300) requires a certain amount of time to switch its RF circuitry from the DL 504 to the UL 508 (e.g., via the antenna switch control component 312).

In real-world telecommunication deployments, the GP 508 should be set in a manner such that DL 504 and UL 502 transitions do not interfere with one another at a network apparatus 200, by advancing UL timing at a mobile device 300 (e.g., via the UL transmission scheduling component 316) such that, at the network apparatus 200, the last UL subframe transmission prior to a UL/DL switch will end before the first DL subframe transmission is initiated. In various situations, the UL timing of each UE 300 can be controlled by the network apparatus 300 using a timing advance mechanism, as would be understood by those skilled in the art. Further, the GP 508 must designated in such a manner as to provide a wireless communication device 300 enough time to receive a DL transmission and then switch from Rx to Tx, before the mobile device 300 starts a subsequent UL transmission, while at the same time accounting for inter-cell interference.

Figure 6A:
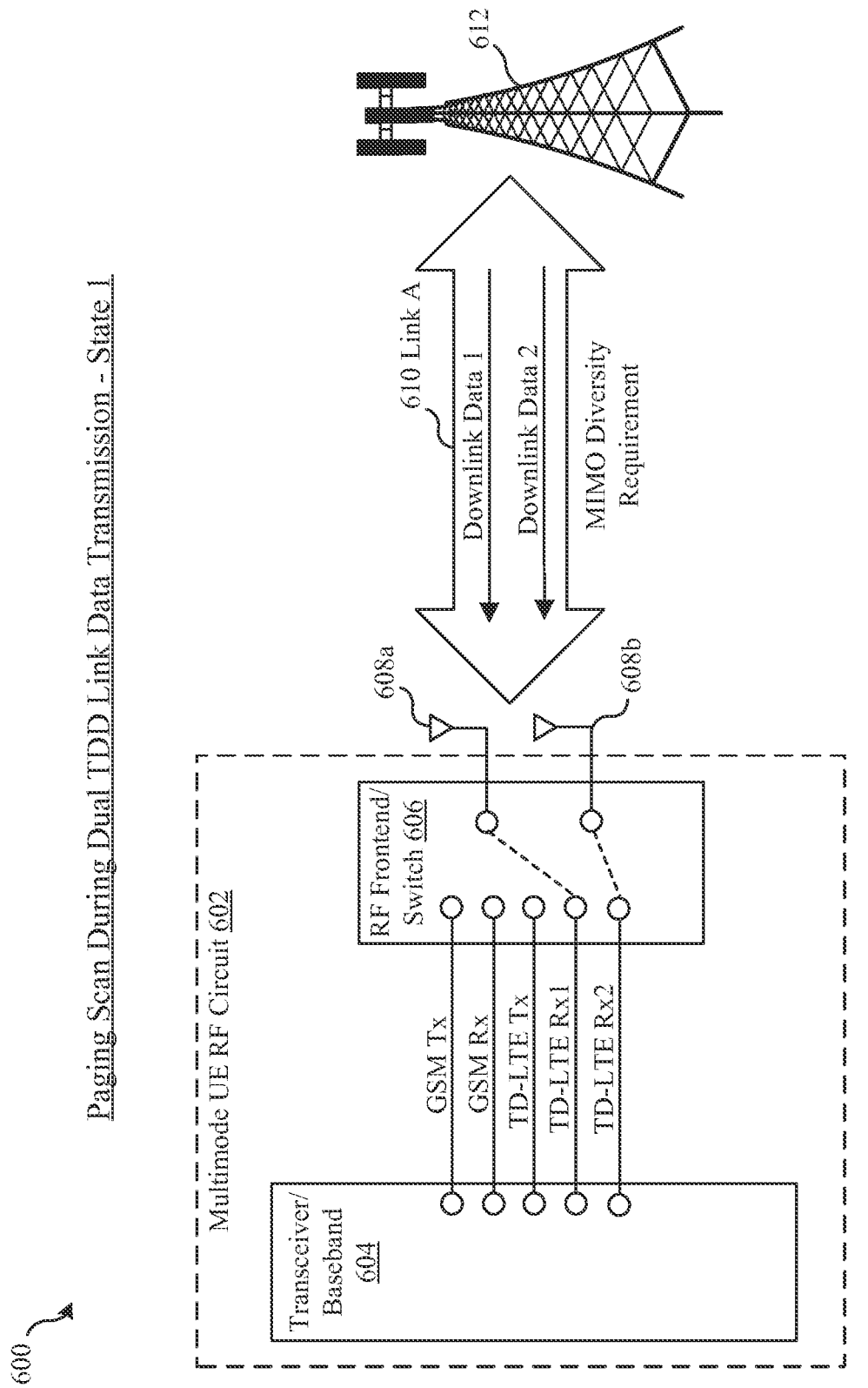
FIG. 6A depicts a first state of a dual TDD link paging scan operation for a mobile device with two or more antennas, in accordance with various embodiments of the disclosure.

FIG. 6A depicts a first state (State 1) 600 of a dual TDD link legacy paging scan operation that occurs during a TDD data transmission for a mobile device 300 with two or more antennas 608a-b, in accordance with various embodiments of the disclosure. The RF circuit 602 of a multi-mode UE 300 is depicted in isolation to show how the switching mechanism, i.e., the RF frontend switch 606, functions during different states of operation. In various implementations, the RF circuit 602 includes, but is not limited to including, a single transceiver and a baseband circuit 604, which may comprise any number of RF baseband processors, and a RF front end switch 606. It should be understood that the state diagram of FIG. 6A is a simplified circuit-level block diagram that does not show all of the hardware components that may be necessary for causing a UE 300 to function as described with respect to FIGS. 6A-B.

In an embodiment, the RF circuit 602, including the transceiver/baseband 604 and the RF frontend switch 606 may be configured to operate using multiple TDD RAT types (e.g., GSM and TD-LTE RAT types). For instance, in various implementations, the RF frontend switch 606 can selectively switch each of the two antennas 608a-b to one of a single TD-LTE transmit configuration, TD-LTE Tx1, a dual TD-LTE receive configuration, TD-LTE Rx1 and TD-LTE Rx2, a single GSM transmit configuration, GSM Tx, and a single GSM receive configuration, GSM Rx. In the first operational state (State 1) 600, the UE RF circuit 602 can be configured to utilize a first antenna 608a to receive a first TD-LTE DL data transmission utilizing the TD-LTE Rx1 configuration, and a second antenna 608b to receive a second TD-LTE DL data transmission utilizing the TD-LTE Rx2 configuration, from a network apparatus 612 via the same TDD communication link (Link A) 610, at the same time (e.g., in accordance with a TD-LTE MIMO antennas diversity requirement).

Figure 6B:
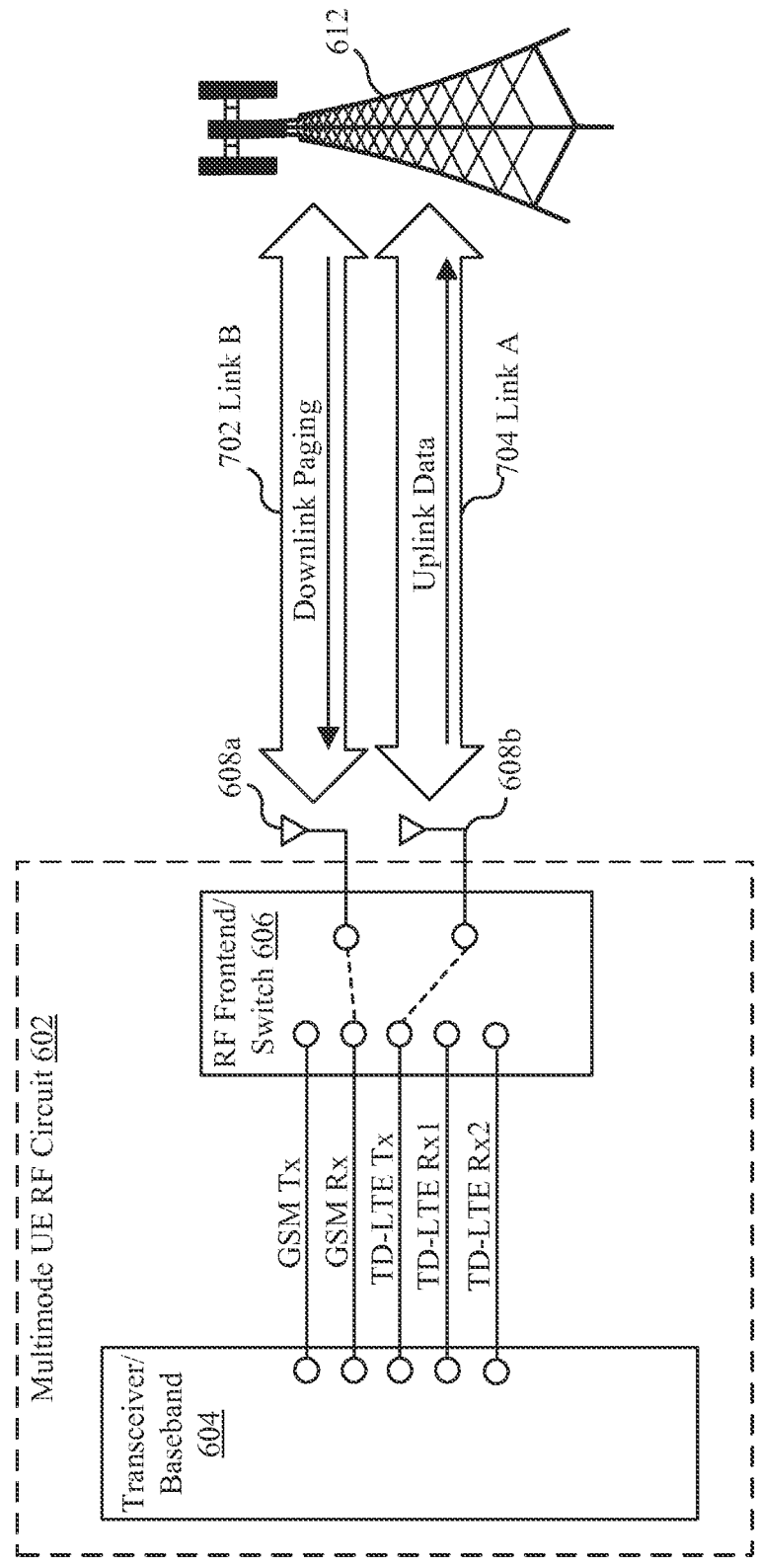
FIG. 6B illustrates a second state of the dual TDD link paging scan operation for the mobile device with two or more antennas of FIG. 6A, in accordance with some embodiments of the disclosure.

FIG. 6B depicts a second state (State 2) 700 of the dual TDD link legacy paging scan operation for the mobile device 300 with two or more antennas 608a-b of FIG. 6A. In the second operational state (State 2) 700, the UE RF circuit 602 can be configured to utilize a first antenna 608a to receive a GSM paging communication utilizing the GSM Rx configuration from a network apparatus 612 via a second TDD communication link (Link B) 702, and a second antenna 608b to send a TD-LTE UL data transmission utilizing the TD-LTE Tx configuration from a network apparatus 612 via a first TDD communication link (Link A) 704, at the same time. Upon receiving the GSM paging communication (e.g., a paging communication associated with a voice call), a UE 300 associated with the RF circuit 602 can accept and conduct the GSM communication (e.g., the voice call) using the GSM Rx and GSM Tx configurations. Consequently, the UE 300 may need to halt all TD-LTE data communications on the DL and the UL to switch from a packet-switched domain (associated with TD-LTE data communications) to a circuit-switched domain for handling the GSM communication (e.g., the voice call).

Figure 6C:
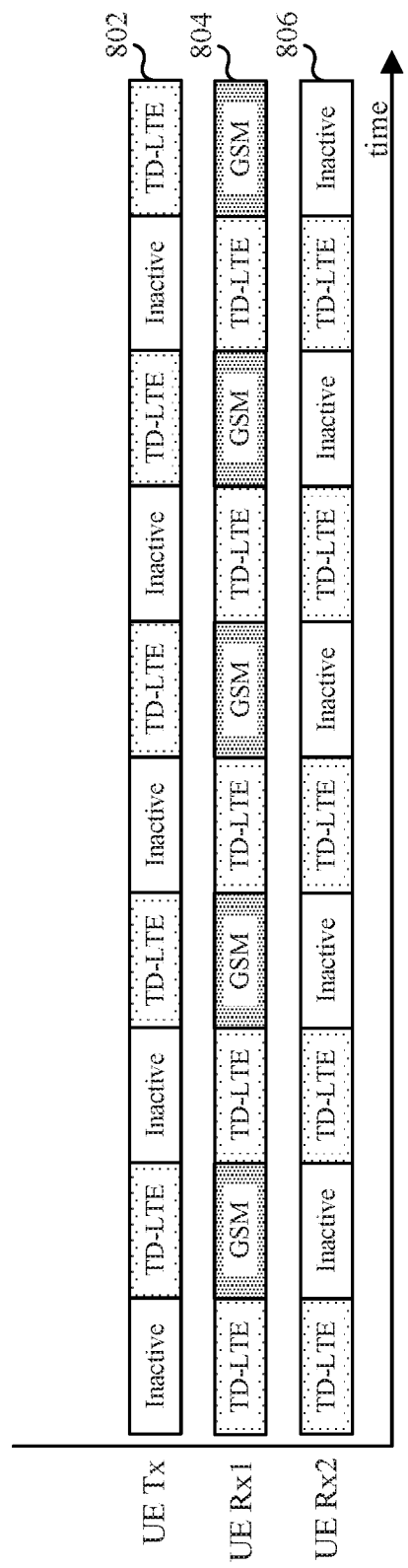
FIG. 6C depicts a timing diagram showing the first and the second states of the dual TDD link paging scan operation of FIGS. 6A-B, in accordance with various embodiments of the disclosure.

FIG. 6C depicts a timing diagram 800 showing the first (State 1, 600) and the second states (State 2, 700) of the dual TDD link paging scan operation of FIGS. 6A-B, in accordance with various embodiments of the disclosure. It should be understood that the UE Tx time slot allocation 802, which is segmented as consecutive TDD UL subframe TTIs, corresponds to the TD-LTE Tx configuration of the RF circuit 602 depicted in FIGS. 6A-B. Further, the UE Rx1 time slot allocation 804, which is segmented as consecutive TDD DL subframe TTIs, corresponds to both the GSM Rx configuration and the TD-LTE Rx1 configuration of the RF circuit 602, and the UE Rx2 time slot allocation 806, which is segmented as consecutive TDD DL subframe TTIs, corresponds to the TD-LTE Rx2 configuration of the RF circuit 602.

In accordance with various embodiments, while in the first state (State 1, 600), the UE Rx1 time slot allocation 804 is in a TD-LTE DL data reception mode (corresponding to the TD-LTE Rx1 configuration), and at the same time, the UE Rx2 time slot allocation 806 is also in a TD-LTE DL data reception mode (corresponding to the TD-LTE Rx2 configuration). In this arrangement, the RF circuit 602 is configured to receive a TD-LTE MIMO DL data transmission from the network apparatus 612 using both of its two antennas 608a-b. Subsequently, while in the second state (State 2, 700), the UE Tx time slot allocation 802 is in a TD-LTE UL data transmission mode (corresponding to the TD-LTE Tx configuration), when the UE Rx1 time slot allocation 804 is a GSM DL reception mode (corresponding to the GSM Rx configuration), e.g., when the UE 300 is listening for a GSM paging communication. In this arrangement, the RF circuit 602 is configured to transmit one TD-LTE UL data transmission at the same time the RF circuit 602 is configured to receive one GSM DL data transmission.

Figure 7A:
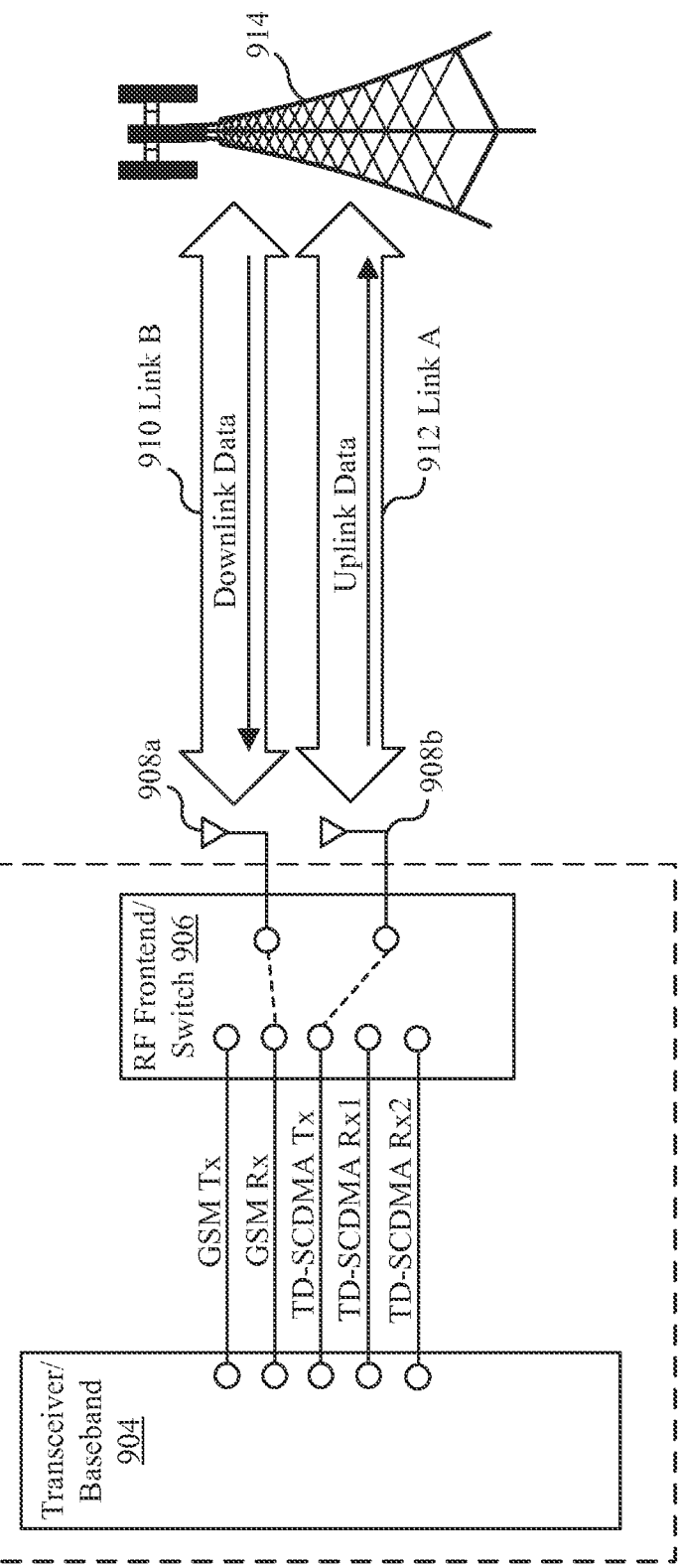
FIG. 7A illustrates a first state of a dual TDD link data transmission for a mobile device with two or more antennas, in accordance with some embodiments of the disclosure.

FIG. 7A illustrates a first state (State 1) 900 of a dual TDD link data transmission for a mobile device 300 configured with two or more antennas 908a-b, in accordance with some embodiments of the disclosure. The RF circuit 902 of a multi-mode UE 300 is depicted in isolation to show how the switching mechanism, i.e., the RF frontend switch 906, functions during different states of operation. In various implementations, the RF circuit 902 includes, but is not limited to including, a single transceiver and a baseband circuit 904, which may comprise any number of RF baseband processors, and a RF front end switch 906. It should be understood that the state diagram of FIG. 7A is a simplified circuit-level block diagram that does not show all of the hardware components that may be necessary for causing a UE 300 to function as described with respect to FIGS. 7A-B.

In an embodiment, the RF circuit 902, including the transceiver/baseband 904 and the RF frontend switch 906 may be configured to operate using multiple TDD RAT types (e.g., GSM and TD-SCDMA RAT types). For instance, in various implementations, the RF frontend switch 906 can selectively switch each of the two antennas 908a-b to one of a single TD-SCDMA transmit configuration, TD-SCDMA Tx, a dual TD-SCDMA receive configuration, TD-SCDMA Rx1 and TD-SCDMA Rx2, a single GSM transmit configuration, GSM Tx, and a single GSM receive configuration, GSM Rx. In the first operational state (State 1) 900, the UE RF circuit 902 can be configured to utilize a first antenna 908a to receive a GSM DL data transmission utilizing the GSM Rx configuration from a network apparatus 914 via a second TDD communication link (Link B) 910, and a second antenna 908b to send a TD-SCDMA UL data transmission utilizing the TD-SCDMA Tx configuration to a network apparatus 914 via a first TDD communication link (Link A) 912, at the same time.

Figure 7B:
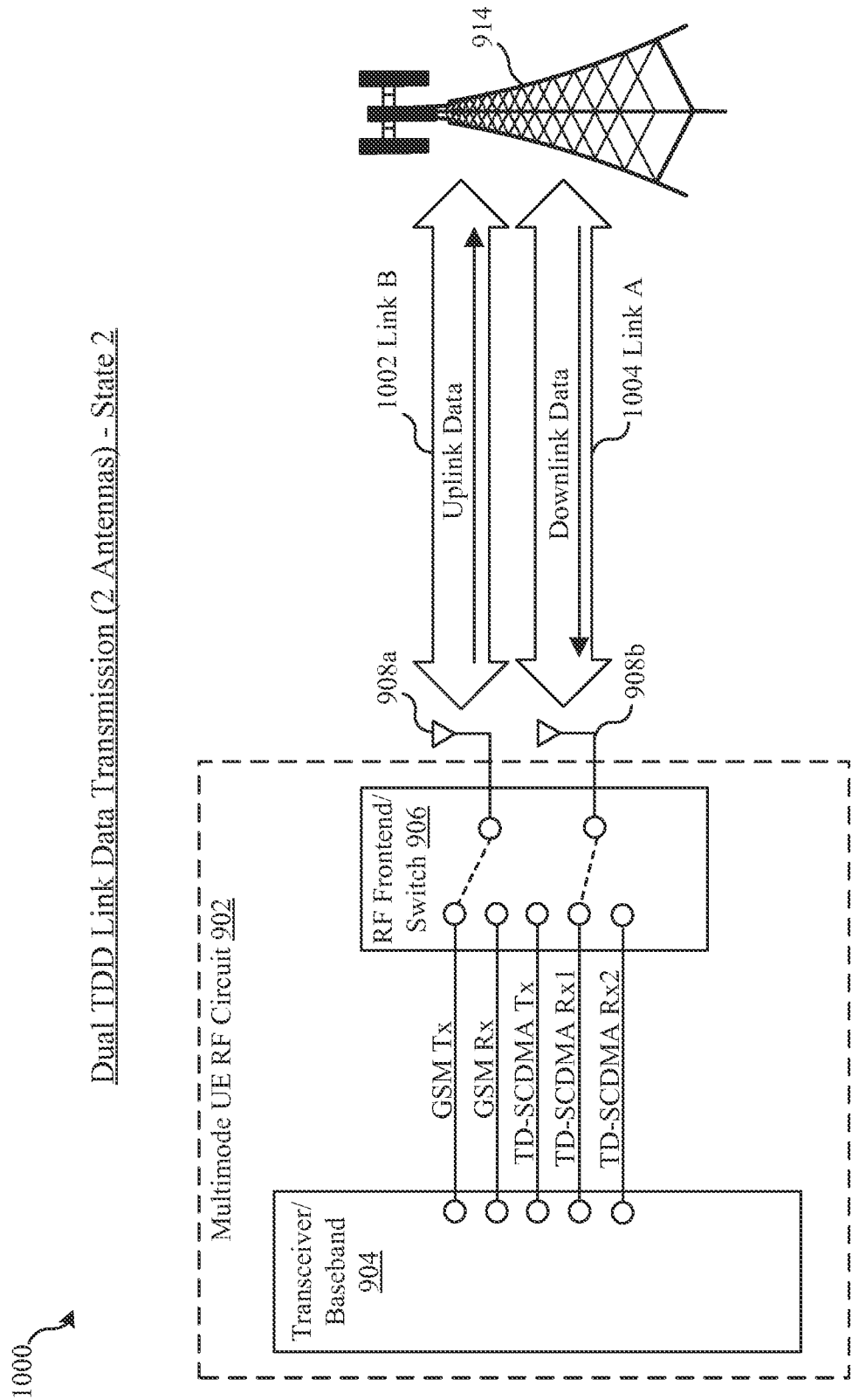
FIG. 7B depicts a second state of the dual TDD link data transmission for the mobile device with two or more antennas of FIG. 7A, in accordance with various embodiments of the disclosure.

FIG. 7B depicts a second state (State 2) 1000 of the dual TDD link data transmission for the mobile device 300 configured with two or more antennas 908a-b of FIG. 7A. In the second operational state (State 2) 1000, the UE RF circuit 902 can be configured to utilize a first antenna 908a to send a GSM UL data transmission utilizing the GSM Tx configuration to a network apparatus 914 via a second TDD communication link (Link B) 1002, and a second antenna 908b to receive a TD-SCDMA DL data transmission utilizing the TD-SCDMA Rx1 configuration from a network apparatus 914 via a first TDD communication link (Link A) 1004, at the same time.

Figure 7C:
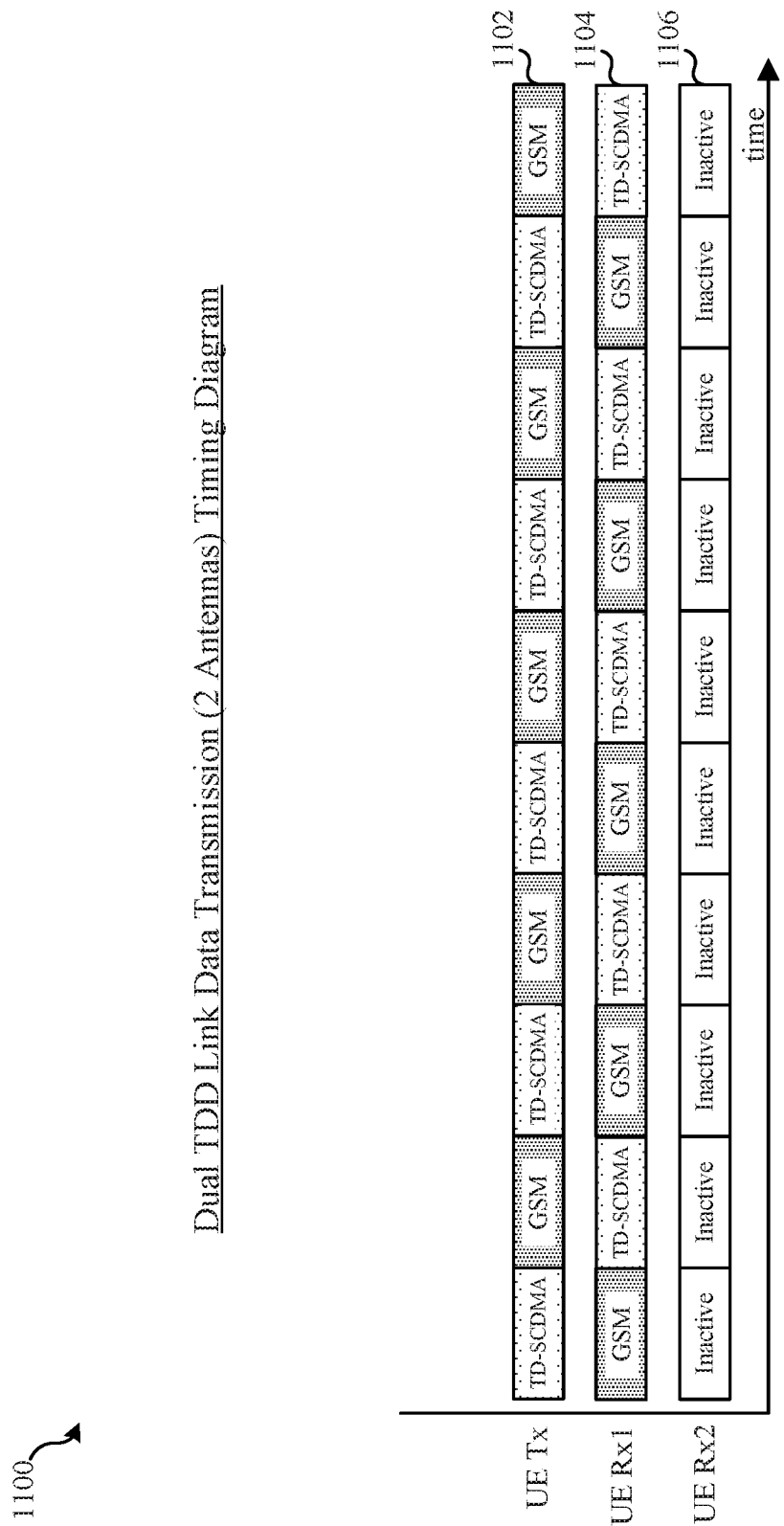
FIG. 7C illustrates a timing diagram showing the first and the second states of the dual TDD link data transmission of FIGS. 7A-B, in accordance with some embodiments of the disclosure.

FIG. 7C depicts a timing diagram 1100 showing the first (State 1, 900) and the second states (State 2, 1000) of the dual TDD link data transmission of FIGS. 7A-B, in accordance with various embodiments of the disclosure. It should be understood that the UE Tx time slot allocation 1102, which is segmented as consecutive TDD UL subframe TTIs, corresponds to both the GSM Tx configuration and the TD-SCDMA Tx configuration of the RF circuit 902 depicted in FIGS. 7A-B. Further, the UE Rx1 time slot allocation 1104, which is segmented as consecutive TDD DL subframe TTIs, corresponds to both the GSM Rx configuration and the TD-SCDMA Rx1 configuration of the RF circuit 902. In this configuration, UE Rx2 time slot allocation 1006 is inactive on all TDD DL subframe TTIs.

In accordance with various embodiments, while in the first state (State 1, 900), the UE Tx time slot allocation 1102 is in TD-SCDMA UL data transmission mode (corresponding to the TD-SCDMA Tx configuration), at the same time the UE Rx1 time slot allocation 1104 is in a GSM DL data reception mode (corresponding to the GSM Rx configuration). Then, while in the second state (State 2, 1000) the UE Tx time slot allocation 1102 is in GSM UL data transmission mode (corresponding to the GSM Tx configuration), at the same time the UE Rx1 time slot allocation 1104 is in a TD-SCDMA DL data reception mode (corresponding to the TD-SCDMA Rx1 configuration).

In this arrangement, the RF circuit 902 is configured to alternate between transmitting/receiving simultaneous GSM DL data and TD-SCDMA UL data, and then after a state switch (e.g., at the RF frontend switch 906), receiving/transmitting simultaneous TD-SCDMA UL data and GSM DL data, in consecutive TDD subframes utilizing dual TDD communication links (Link A and Link B), at the same time. Accordingly, in this configuration, TDD DL data is always capable of being received at the RF circuit 902, while at the same time, TDD UL data is always capable of being transmitted from the RF circuit 902, by employing two or more TDD communication links 910 and 912.

Figure 8A:
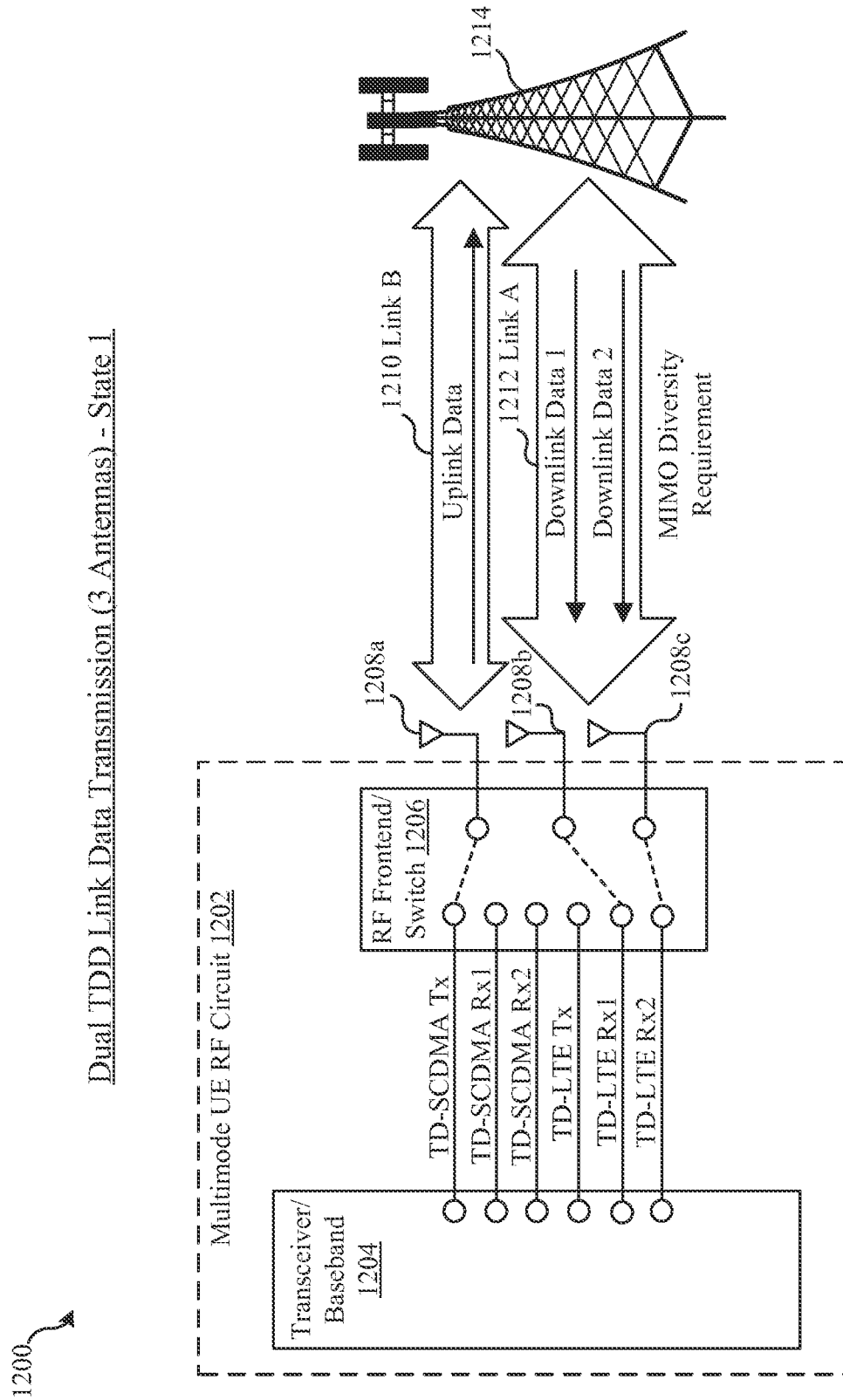
FIG. 8A depicts a first state of a dual TDD link data transmission for a mobile device with three or more antennas, in accordance with various embodiments of the disclosure.

FIG. 8A depicts a first state (State 1) 1200 of a dual TDD link data transmission for a mobile device 300 configured with three or more antennas 1208a-c, in accordance with various embodiments of the disclosure. The RF circuit 1202 of a multi-mode UE 300 is depicted in isolation to show how the switching mechanism, i.e., the RF frontend switch 1206, functions during different states of operation. In various implementations, the RF circuit 1202 includes, but is not limited to including, a single transceiver and a baseband circuit 1204, which may comprise any number of RF baseband processors, and a RF front end switch 1206. It should be understood that the state diagram of FIG. 8A is a simplified circuit-level block diagram that does not show all of the hardware components that may be necessary for causing a UE 300 to function as described with respect to FIGS. 8A-B.

In an embodiment, the RF circuit 1202, including the transceiver/baseband 1204 and the RF frontend switch 1206 may be configured to operate using multiple TDD RAT types (e.g., TD-SCDMA and TD-LTE RAT types). For instance, in various implementations, the RF frontend switch 1206 can selectively switch each of the three antennas 1208a-c to one of a single TD-SCDMA transmit configuration, TD-SCDMA Tx, a dual TD-SCDMA receive configuration, TD-SCDMA Rx1 and TD-SCDMA Rx2, a single TD-LTE transmit configuration, TD-LTE Tx, and a dual TD-LTE receive configuration, TD-LTE Rx1 and TD-LTE Rx1.

In the first operational state (State 1) 1200, the UE RF circuit 1202 can be configured to utilize a first antenna 1208a to transmit a TD-SCDMA UL data transmission utilizing the TD-SCDMA Tx configuration to a network apparatus 1214 via a second TDD communication link (Link B) 1210, a second antenna 1208b to receive a first TD-LTE DL data transmission utilizing the TD-LTE Rx1 configuration from a network apparatus 1214, as well as, a third antenna 1208c to receive a second TD-LTE DL data transmission utilizing the TD-LTE Rx2 configuration from a network apparatus 1214 via a first TDD communication link (Link A) 1212, at the same time (e.g., in accordance with a TD-LTE MIMO antennas diversity requirement). It should be understood that the first and second TD-LTE data transmissions, utilizing the TD-LTE Rx1 and TD-LTE Rx2 configurations, correspond to a single MIMO DL transmission.

Figure 8B:
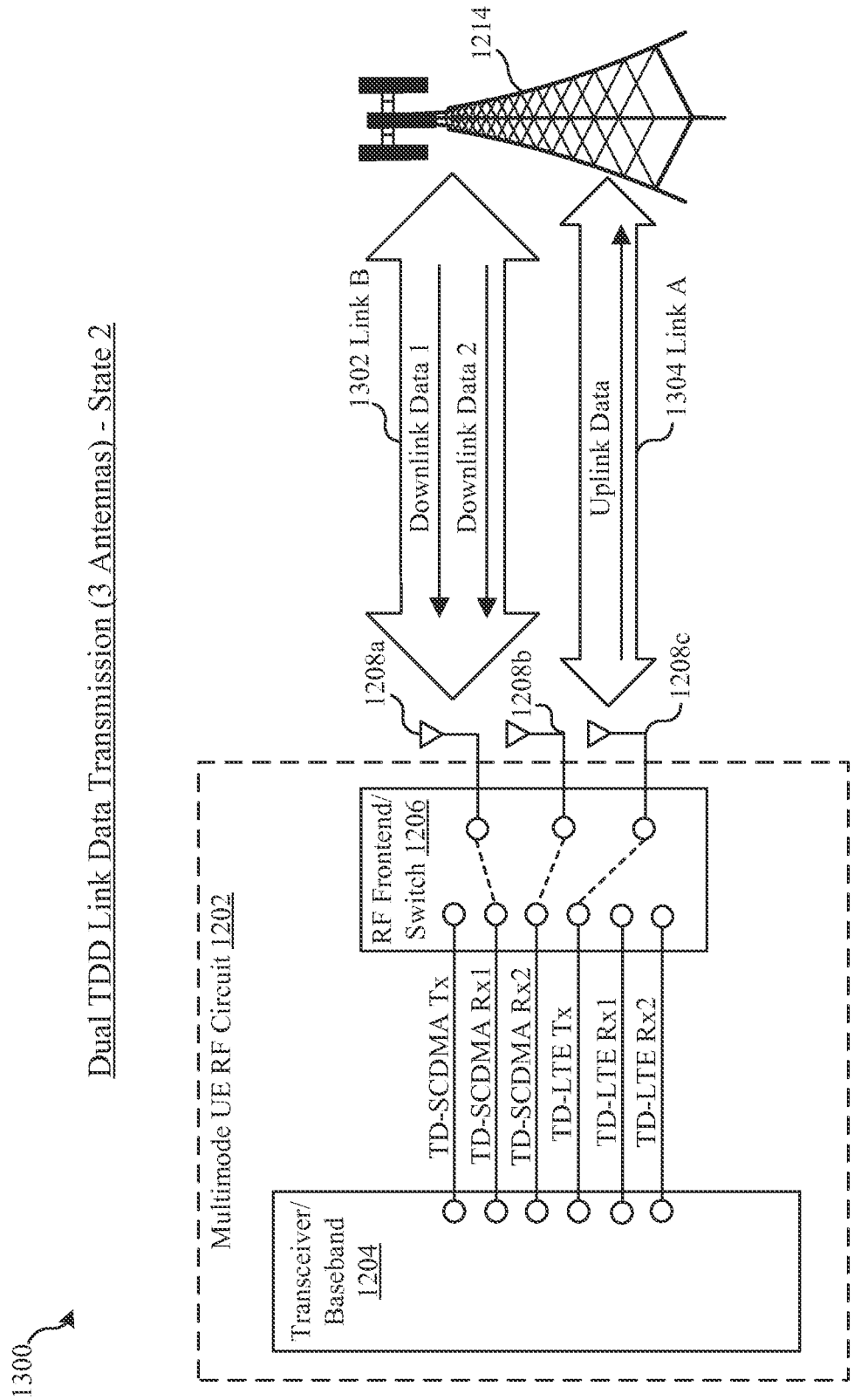
FIG. 8B illustrates a second state of the dual TDD link data transmission for the mobile device with three or more antennas of FIG. 8A, in accordance with some embodiments of the disclosure.

FIG. 8B depicts a second state (State 2) 1300 of the dual TDD link data transmission for the mobile device 300 configured with three or more antennas 1308a-b of FIG. 8A. In the second operational state (State 2) 1300, the UE RF circuit 1202 can be configured to utilize a first antenna 1208a to receive a first TD-SCDMA DL data transmission utilizing the TD-SCDMA Rx1 configuration from a network apparatus 1214 via a second TDD communication link (Link B) 1302, a second antenna 1208b to receive a second TD-SCDMA DL data transmission utilizing the TD-SCDMA Rx2 configuration from the network apparatus 1214 via the second TDD communication link (Link B) 1302, and a third antenna 1208c to transmit a TD-LTE UL data transmission utilizing the TD-LTE Tx configuration to the network apparatus 1214 via a first TDD communication link (Link A) 1304, at the same time.

Figure 8C:
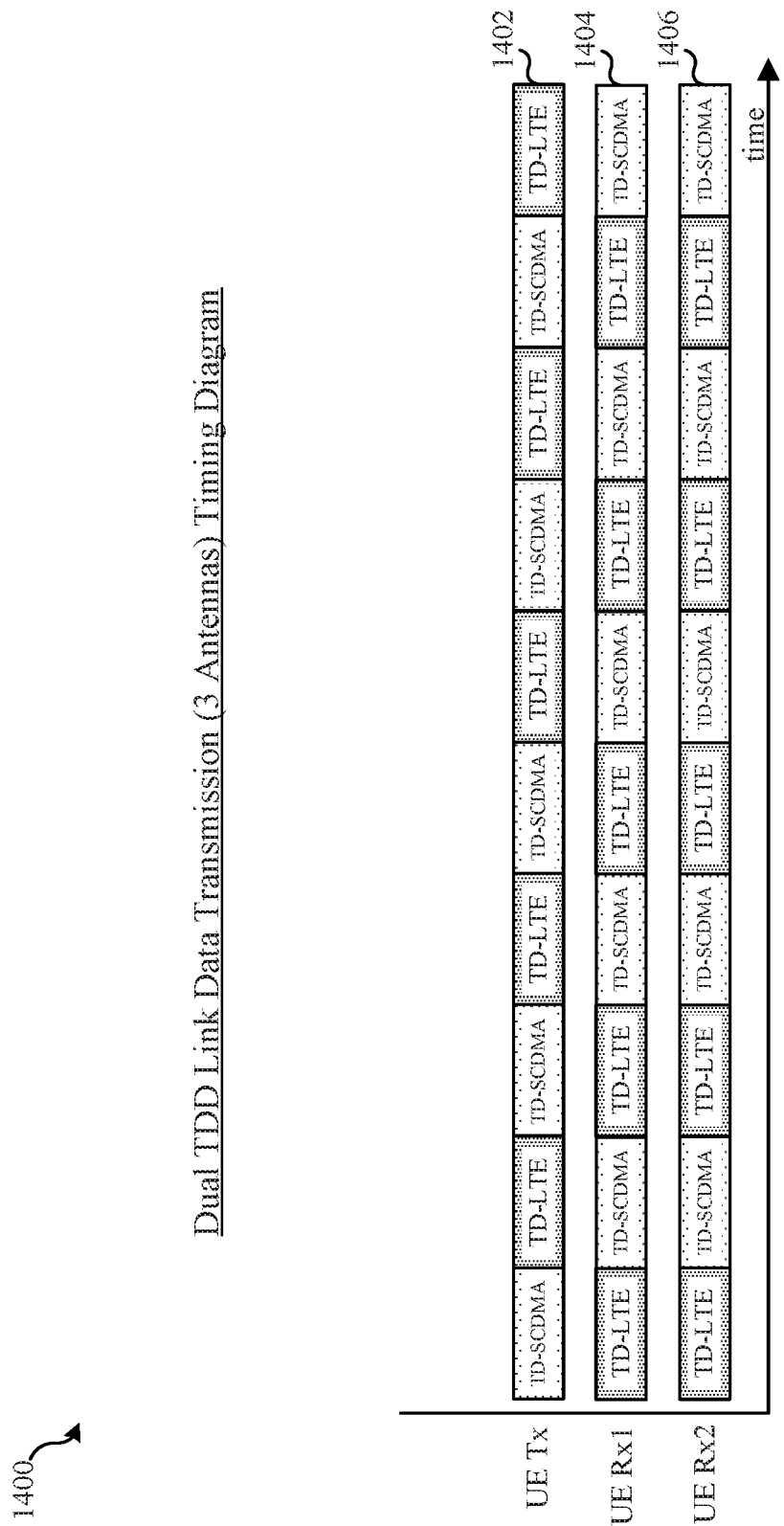
FIG. 8C depicts a timing diagram showing the first and the second states of the dual TDD link data transmission of FIGS. 8A-B, in accordance with various embodiments of the disclosure.

FIG. 8C depicts a timing diagram 1400 showing the first (State 1, 1200) and the second states (State 2, 1300) of the dual TDD link data transmission of FIGS. 8A-B, in accordance with various embodiments of the disclosure. It should be understood that the UE Tx time slot allocation 1402, which is segmented as consecutive TDD UL subframe TTIs, corresponds to both the TD-SCDMA Tx configuration and the TD-LTE Tx configuration of the RF circuit 1202 depicted in FIGS. 8A-B. Further, the UE Rx1 time slot allocation 1404, which is segmented as consecutive TDD DL subframe TTIs, corresponds to both the TD-LTE Rx1 configuration and the TD-SCDMA Rx1 configuration of the RF circuit 1202. Whereas the UE Rx2 time slot allocation 1406, which is segmented as consecutive TDD DL subframe TTIs, corresponds to both the TD-LTE Rx2 configuration and the TD-SCDMA Rx2 configuration of the RF circuit 1202.

In accordance with various embodiments, while in the first state (State 1, 1200), the UE Tx time slot allocation 1402 is in TD-SCDMA transmission mode (corresponding to the TD-SCDMA Tx configuration), at the same time the UE Rx1 time slot allocation 1404 is in a TD-LTE DL data reception mode (corresponding to the TD-LTE Rx1 configuration) and the UE Rx2 time slot allocation 1406 is in a TD-LTE DL data reception mode (corresponding to the TD-LTE Rx2 configuration). Then, while in the second state (State 2, 1300) the UE Tx time slot allocation 1402 is in TD-LTE transmission mode (corresponding to the TD-LTE Tx configuration), at the same time the UE Rx1 time slot allocation 1404 is in a TD-SCDMA DL data reception mode (corresponding to the TD-LTE Rx1 configuration) and the UE Rx2 time slot allocation 1406 is in a TD-SCDMA DL data reception mode (corresponding to the TD-LTE Rx2 configuration). In this arrangement, the RF circuit 1202 is configured to alternate between transmitting simultaneous TD-SCDMA UL data along with receiving dual TD-LTE DL data, and then after a switch event, transmitting simultaneous TD-LTE UL data along with receiving dual TD-SCDMA DL data, in consecutive TDD subframes utilizing dual TDD communication links (Link A and Link B), at the same time.

Figure 9A:
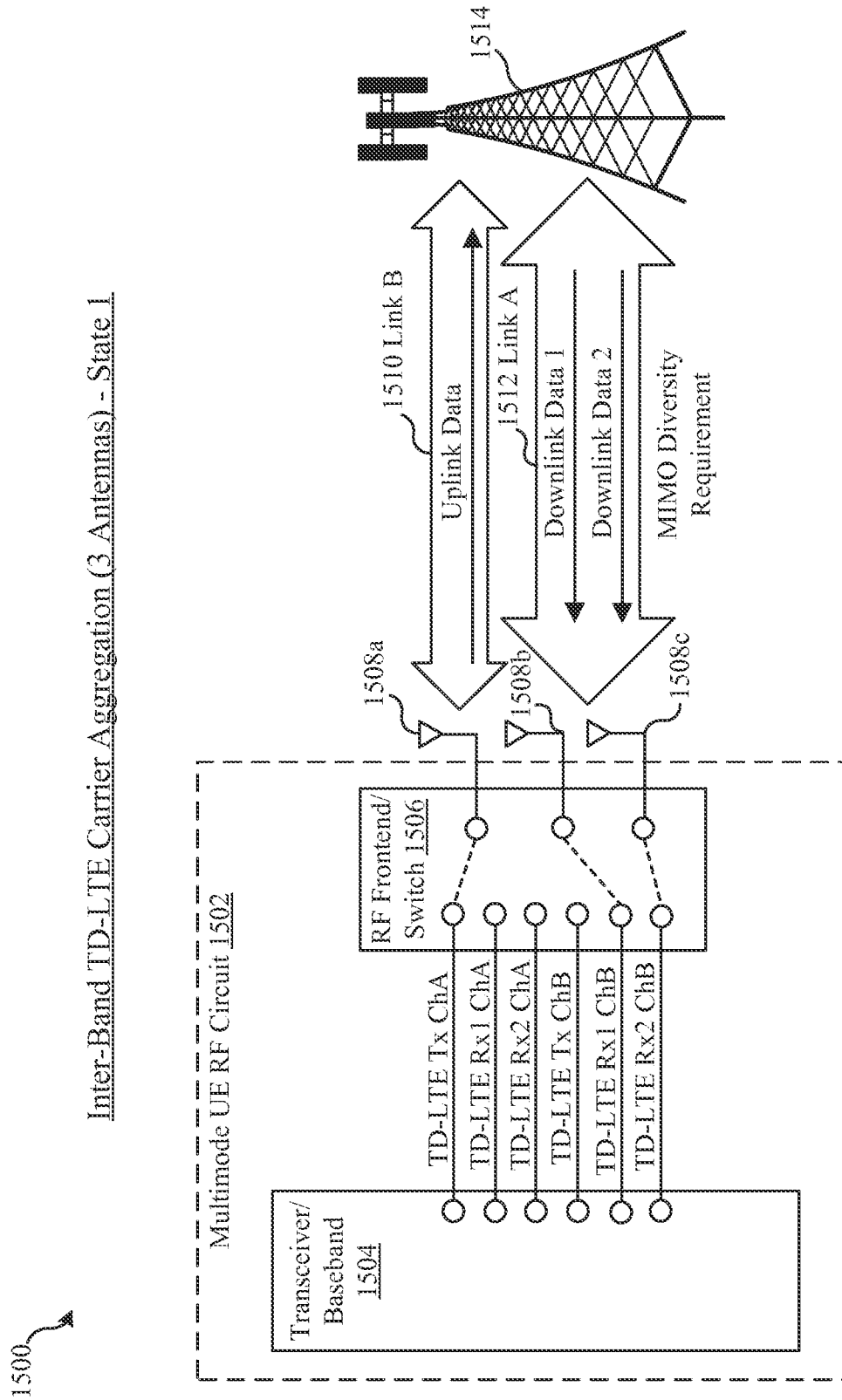
FIG. 9A illustrates a first state of an Inter-Band time division LTE (TD-LTE) carrier aggregation data transmission for a mobile device with three or more antennas, in accordance with some embodiments of the disclosure.

FIG. 9A illustrates a first state (State 1) 1500 of an Inter-Band TD-LTE carrier aggregation data transmission for a mobile device 300 that is configured with three or more antennas 1508a-c, in accordance with some embodiments of the disclosure. The RF circuit 1502 of a multi-mode UE 300 is depicted in isolation to show how the switching mechanism, i.e., the RF frontend switch 1506, functions during different states of operation. In various implementations, the RF circuit 1502 includes, but is not limited to including, a single transceiver and a baseband circuit 1504, which may comprise any number of RF baseband processors, and a RF front end switch 1506. It should be understood that the state diagram of FIG. 9A is a simplified circuit-level block diagram that does not show all of the hardware components that may be necessary for causing a UE 300 to function as described with respect to FIGS. 9A-B.

In an embodiment, the RF circuit 1502, including the transceiver/baseband 1504 and the RF frontend switch 1506 may be configured to operate using a single TDD RAT type (e.g., TD-LTE) over multiple communication channels (ChA and ChB, e.g., on TD-LTE channel B38 and TD-LTE channel 41). For instance, in various implementations, the RF frontend switch 1506 can selectively switch each of the three antennas 1508a-c to one of two TD-LTE transmit configurations, TD-LTE Tx ChA and TD-LTE Tx ChB, and two of four TD-LTE receive configurations, TD-LTE Rx1 ChA, TD-LTE Rx2 ChB, TD-LTE Rx1 ChB, and TD-LTE Rx2 ChA, while in different operational states to support TD-LTE carrier aggregation over dual TDD communication links 1510 (Link B) and 1512 (Link A).

In the first operational state (State 1) 1500, the UE RF circuit 1502 can be configured to utilize a first antenna 1508a to transmit a TD-LTE UL data transmission utilizing the TD-LTE Tx ChA configuration to a network apparatus 1514 via a second TDD communication link (Link B) 1510, a second antenna 1508b to receive a first TD-LTE DL data transmission utilizing the TD-LTE Rx1 ChB configuration from a network apparatus 1514, as well as, a third antenna 1508c to receive a second TD-LTE DL data transmission utilizing the TD-LTE Rx2 ChB configuration from a network apparatus 1514 via a first TDD communication link (Link A) 1512, at the same time (e.g., in accordance with a TD-LTE MIMO antennas diversity requirement). It should be understood that the first and second TD-LTE data transmissions, utilizing the TD-LTE Rx1 ChB and TD-LTE Rx2 ChB configurations, correspond to a single MIMO DL transmission.

Figure 9B:
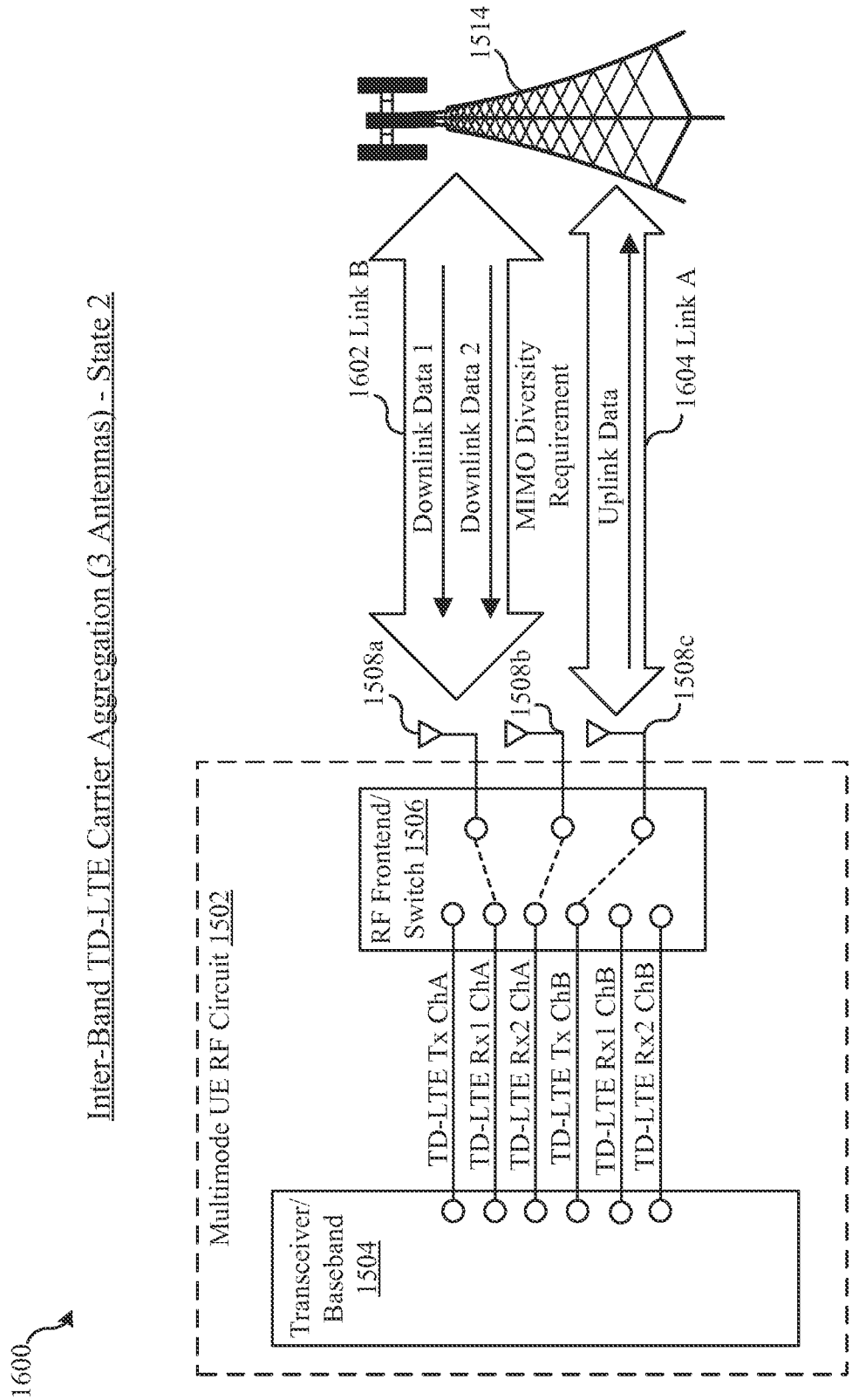
FIG. 9B depicts a second state of the Inter-Band TD-LTE carrier aggregation data transmission for the mobile device with three or more antennas of FIG. 9A, in accordance with various embodiments of the disclosure.

FIG. 9B depicts a second state (State 2) 1600 of the Inter-Band TD-LTE carrier aggregation data transmission for a mobile device 300 that is configured with three or more antennas 1508a-c of FIG. 8A. In the second operational state (State 2) 1600, the UE RF circuit 1502 can be configured to utilize a first antenna 1508a to receive a first TD-LTE DL data transmission utilizing the TD-LTE Rx1 ChA configuration from a network apparatus 1514, as well as, a second antenna 1508b to receive a second TD-LTE DL data transmission utilizing the TD-LTE Rx2 ChA configuration from a network apparatus 1514 via a second TDD communication link (Link B) 1602, at the same time (e.g., in accordance with a TD-LTE MIMO antennas diversity requirement), as well as to send a TD-LTE UL data transmission utilizing the TD-LTE Tx ChB configuration to a network apparatus 1514 via a first TDD communication link (Link A) 1604, simultaneously. It should be understood that the first and second TD-LTE data transmissions, utilizing the TD-LTE Rx1 ChA and TD-LTE Rx2 ChA configurations, correspond to a single MIMO DL transmission.

Figure 9C:
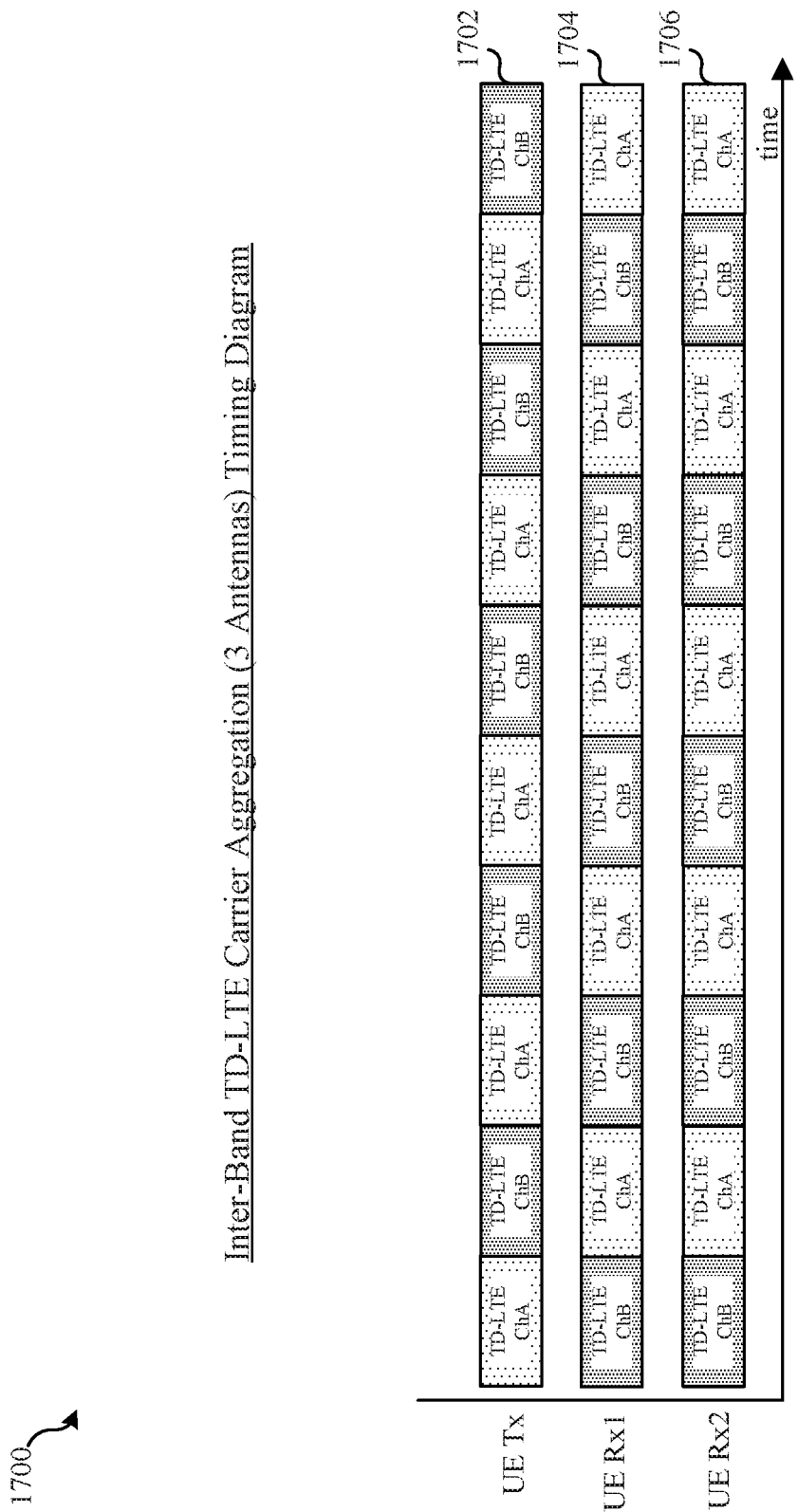
FIG. 9C illustrates a timing diagram showing the first and second states of the Inter-Band TD-LTE carrier aggregation data transmission of FIGS. 9A-B, in accordance with some embodiments of the disclosure.

FIG. 9C depicts a timing diagram 1700 showing the first (State 1, 1500) and the second states (State 2, 1600) of the Inter-Band TD-LTE carrier aggregation data transmission of FIGS. 9A-B, in accordance with various embodiments of the disclosure. It should be understood that the UE Tx time slot allocation(s) 1702, which is segmented as consecutive TDD UL subframe TTIs, corresponds to both the TD-LTE Tx ChA and the TD-LTE Tx ChB configurations of the RF circuit 1502 depicted in FIGS. 9A-B. Further, the UE Rx1 time slot allocation 1704, which is segmented as consecutive TDD DL subframe TTIs, corresponds to both the TD-LTE Rx1 ChA and the TD-LTE Rx2 ChB configurations of the RF circuit 1502. Whereas the UE Rx2 time slot allocation 1706, which is segmented as consecutive TDD DL subframe TTIs, corresponds to both the TD-LTE Rx1 ChB and TD-LTE Rx2 ChA configurations of the RF circuit 1702.

In accordance with various embodiments, while in the first state (State 1, 1500), the UE Tx time slot allocation 1702 is in a TD-LTE UL data transmission mode (corresponding to the TD-LTE Tx ChA configuration), at the same time the UE Rx1 time slot allocation 1704 is in a TD-LTE DL data reception mode (corresponding to the TD-LTE Rx1 ChB configuration) and the UE Rx2 time slot allocation 1706 is in a TD-LTE DL data reception mode (corresponding to the TD-LTE Rx2 ChA configuration). Then, while in the second state (State 2, 1600) the UE Tx time slot allocation 1702 is in a TD-LTE UL data transmission mode (corresponding to the TD-LTE Tx ChB configuration), at the same time the UE Rx1 time slot allocation 1704 is in a TD-LTE DL data reception mode (corresponding to the TD-LTE Rx1 ChA configuration) and the UE Rx2 time slot allocation 1706 is in a TD-LTE DL data reception mode (corresponding to the TD-LTE Rx2 ChB configuration).

In this arrangement, the RF circuit 1502 is configured to alternate between transmitting simultaneous TD-LTE UL data using a first LTE communication channel (ChA) along with receiving dual TD-LTE DL data using a second LTE communication channel (ChB), and then after a switch event, transmitting simultaneous TD-LTE UL data along using a second LTE communication channel (ChB) along with receiving dual TD-LTE DL data using a first LTE communication channel (ChA), in consecutive TDD subframes utilizing dual TDD communication links (Link A and Link B), at the same time.

Figure 10:
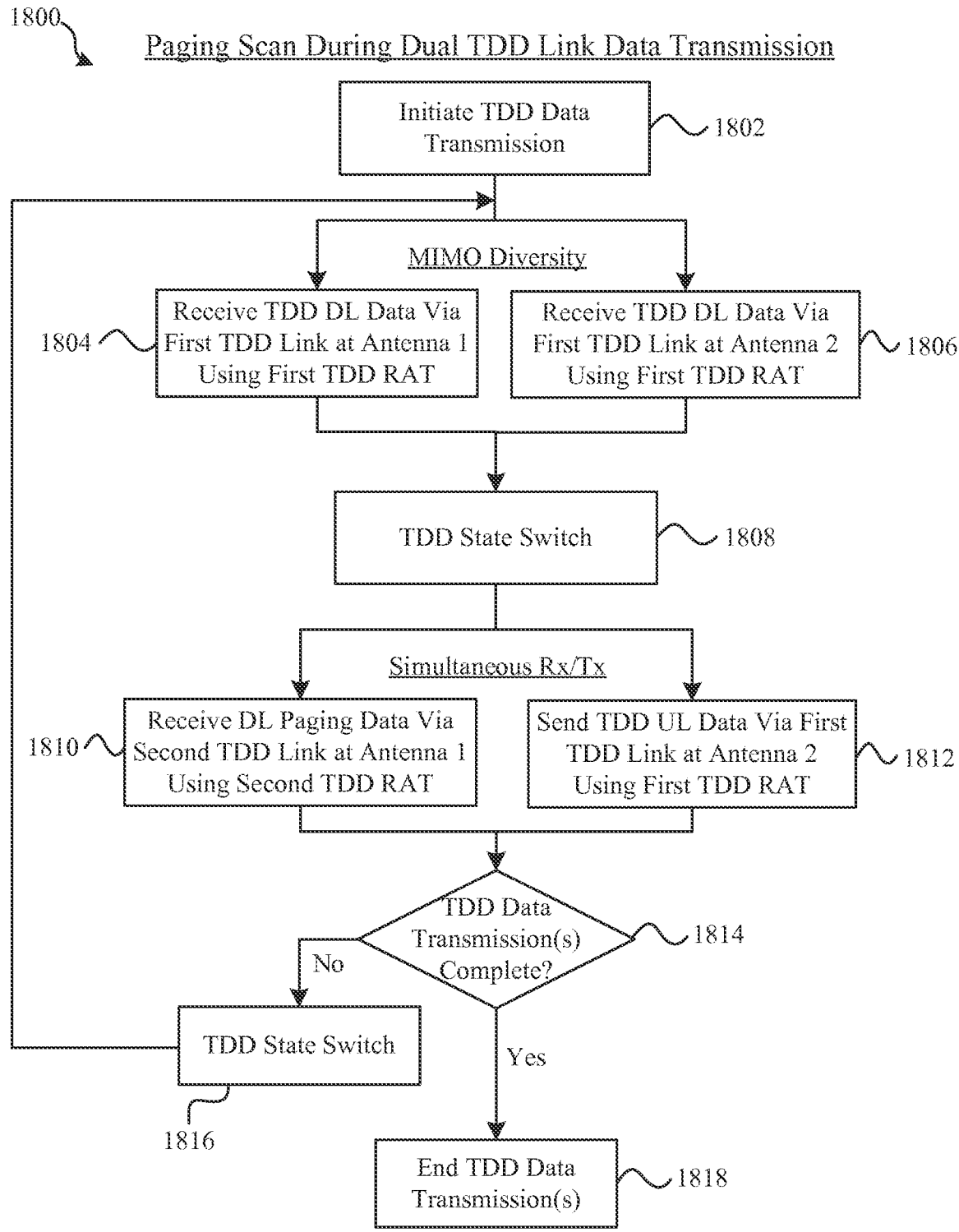
FIG. 10 depicts a flow diagram of a procedure for a dual TDD link paging scan operation, in accordance with various embodiments of the disclosure.

FIG. 10 depicts a flow diagram depicting various procedures 1800 for performing a dual TDD link paging scan operation during a TD-LTE data transmission, in accordance with various embodiments of the disclosure. In this regard, it should be understood that any or all of the procedures 1800 depicted in FIG. 10 may be associated with a method, or methods, that can be implemented by the execution of computer-executable instructions (e.g., computer program code) stored in a non-transitory computer-readable memory 306 of a wireless communication device 300, optionally in conjunction with the execution of computer-executable instructions (e.g., computer program code) stored in a non-transitory computer-readable memory 206 of an eNodeB 200 and/or any other common telecommunication network entity.

Initially, at operation block 1802 one or more TDD data transmission(s) may be initiated for a wireless communication device 300. Then, at operation block 1804, the wireless communication device 300 can receive TDD DL data via a first TDD link (e.g., via Link A) at a first antenna 608a using a first TDD RAT (e.g., via the TD-LTE communication standard), while at the same time, at operation block 1806, the wireless communication device 300 can receive TDD DL data via the first TDD link (e.g., via Link A) at a second antenna 608b using the first TDD RAT (e.g., in accordance with a TD-LTE MIMO antennas diversity requirement). Then, at operation block 1808, the wireless communication device 300 (and the network) can perform a TDD state switch (e.g., using the RF frontend switch 906).

Subsequently, at operation blocks 1810 and 1812, DL paging data (e.g., relating to voice call indication) may be received via a second TDD link (e.g., via Link B) at the first antenna 608a using a second TDD RAT (e.g., the GSM telecommunication standard), while at the same time, TDD UL data is transmitted from the wireless communication device 300 to the network via the first TDD link (e.g., via Link A) at the second antenna 608b, using the first TDD RAT (e.g., TD-LTE). Thereafter, at decision block 1814, a determination is made (e.g., by a network entity 200 and/or the wireless communication device 300) as to whether all TDD UL and DL transmission(s) are complete.

In a scenario where a determination is made that all TDD UL and DL transmission(s) are complete, at decision block 1814, the process proceeds to operation block 1818, where all corresponding TDD data transmissions for the wireless communication device 300 are stopped. However, in a scenario, where a determination is made that all TDD UL and DL transmission(s) are not complete, at decision block 1814, the process proceeds to operation block 1816, where the wireless communication device 300 (and the network) can perform another TDD state switch (e.g., using the RF frontend switch 906). Thereafter, the procedure loops back to the simultaneous TDD Rx transmission of operation blocks 1804 and 1806, such that further TDD DL and/or UL data transmissions can be performed for the wireless communication device 300. It should be understood that at operation block 1810, when an indication of a voice call has been received, TD-LTE communications may be halted so that the received voice call can be conducted.

Figure 11:
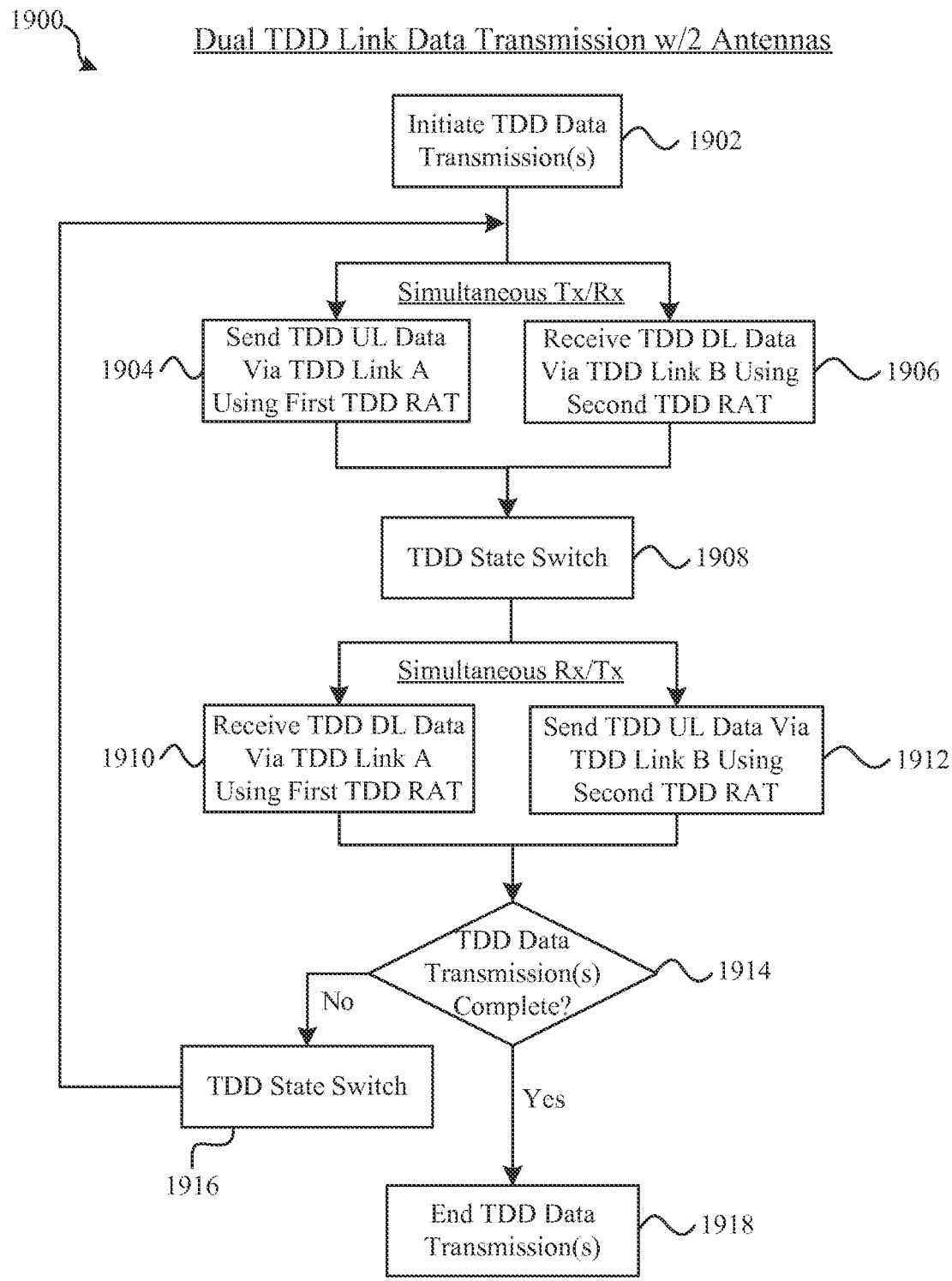
FIG. 11 illustrates a flow diagram of a procedure for a dual TDD link data transmission, in accordance with some embodiments of the disclosure.

FIG. 11 depicts a flow diagram showing various procedures 1900 for performing a dual TDD link data transmission, in accordance with some embodiments of the disclosure. In this regard, it should be understood that any or all of the procedures 1900 depicted in FIG. 11 may be associated with a method, or methods, that can be implemented by the execution of computer-executable instructions (e.g., computer program code) stored in a non-transitory computer-readable memory 306 of a wireless communication device 300, optionally in conjunction with the execution of computer-executable instructions (e.g., computer program code) stored in a non-transitory computer-readable memory 206 of network base station 200 and/or any other common telecommunication network entity.

Initially, at operation block 1902 one or more TDD data transmission(s) may be initiated for a wireless communication device 300. Next, at operation block 1904, the wireless communication device 300 may send TDD UL data to a network entity 200 (e.g., a network base station 914 of FIG. 7A) via a first TDD link (e.g., Link A of 912) using a first TDD RAT (e.g., the TD-SCDMA telecommunication standard), at the same time, the wireless communication device 300 receives a TDD DL data from a network entity 200 (e.g., a network base station) using a second TDD RAT (e.g., GSM). Subsequently, at operation block 1908, the wireless communication device 300 (and the network) can perform a TDD state switch (e.g., using the RF frontend switch 906).

Then, at operation block 1910, the wireless communication device 300 can receive TDD DL data via the first TDD link (e.g., Link A 912) using the first TDD RAT (e.g., TD-SCDMA), while at the same time, the wireless communication device 300 sends TDD UL data via the second TDD link (e.g., Link B 912) using the second TDD RAT (e.g., GSM). Next, at decision block 1914, a determination is made (e.g., by a network entity 200 and/or the wireless communication device 300) as to whether all TDD UL and DL transmission(s) are complete.

In a scenario where a determination is made that all TDD UL and DL transmission(s) are complete, at decision block 1914, the process proceeds to operation block 1918, where all corresponding TDD data transmissions for the wireless communication device 300 are stopped. Alternatively, in a scenario, where a determination is made that all TDD UL and DL transmission(s) are not complete, at decision block 1914, the process proceeds to operation block 1916, where the wireless communication device 300 (and the network) can perform another TDD state switch (e.g., using the RF frontend switch 906). Thereafter, the procedure loops back to the simultaneous Tx/Rx TDD transmission of operation blocks 1904 and 1906, such that further TDD UL and DL data transmissions are performed for the wireless communication device 300.

Figure 12:
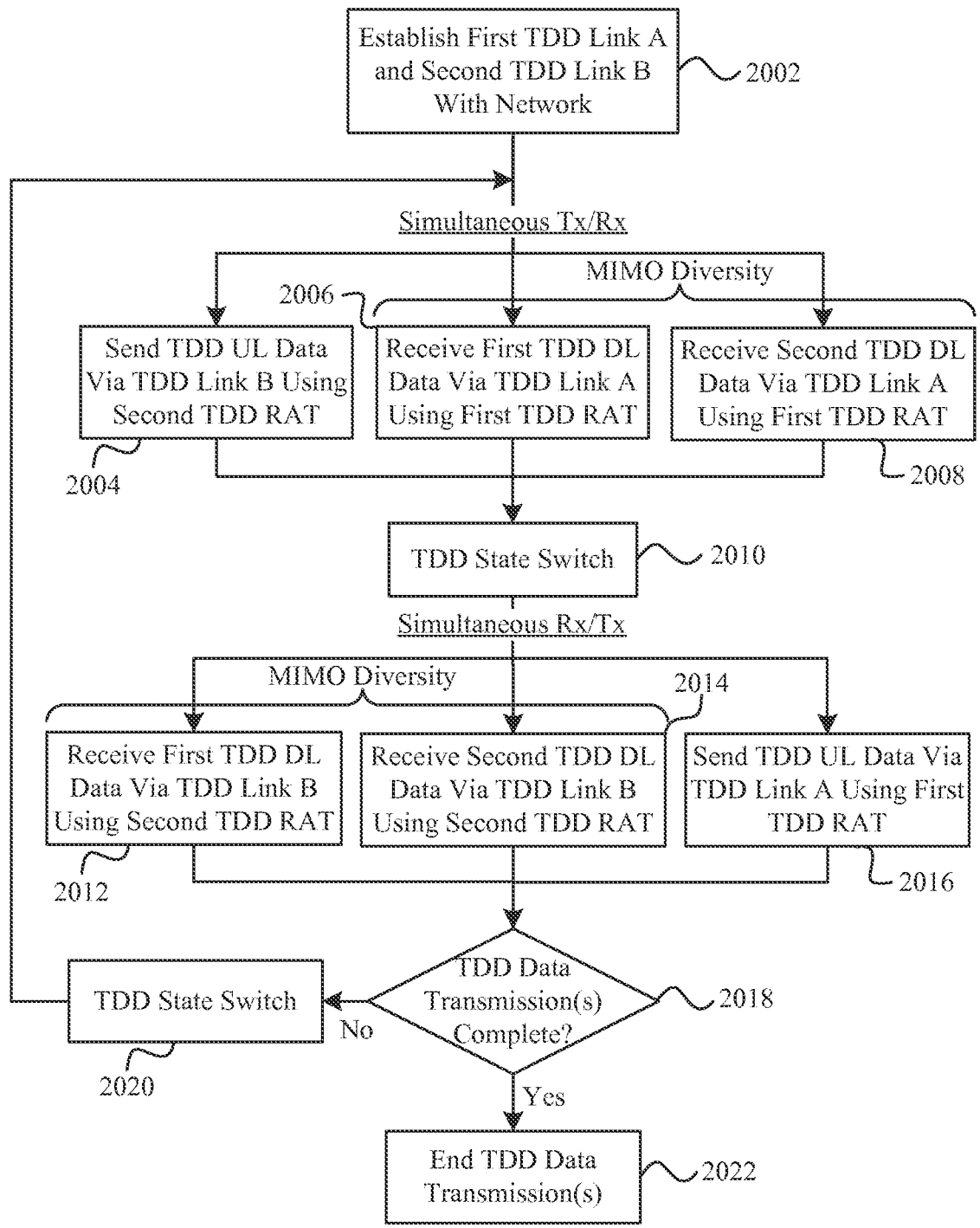
FIG. 12 depicts a flow diagram of another procedure for a dual TDD link data transmission, in accordance with various embodiments of the disclosure.

FIG. 12 depicts a flow diagram showing other procedures 2000 for performing a dual TDD link data transmission at a mobile device 300 with three antennas, in accordance with various embodiments of the disclosure. In this regard, it should be understood that any or all of the procedures 2000 depicted in FIG. 12 can be associated with a method, or methods, that can be implemented by the execution of computer-executable instructions (e.g., computer program code) stored in a non-transitory computer-readable memory 306 of a wireless communication device 300, optionally in conjunction with the execution of computer-executable instructions (e.g., computer program code) stored in a non-transitory computer-readable memory 206 of an eNodeB 200 and/or any other common telecommunication network entity.

Initially, at operation block 2002 a first (e.g., Link A 1212 of FIG. 8A) and a second TDD communication link (e.g., Link B 1210) may be established for a mobile device 300. Next, at operation block 2006, the mobile device 300 may send TDD UL data to a network entity 200 (e.g., a network base station 1214) via the second TDD link (e.g., Link B) using a first TDD RAT (e.g., TD-SCDMA), at the same time, the wireless communication device 300 receives first and second TDD DL data from a network entity 200 via the first TDD link (e.g., Link A) using a second TDD RAT (e.g., TD-LTE), at operation blocks 2006 and 2008 (e.g., in accordance with a TD-LTE MIMO antennas diversity requirement).

Subsequently, at operation block 2010, the wireless communication device 300 (and the network) can perform a TDD state switch (e.g., using the RF frontend switch 1206). Then, the wireless communication device 300 can receive first and second TDD DL data from a network entity 200 via the second TDD link (e.g., Link B) using the second TDD RAT (e.g., TD-LTE), at operation blocks 2012 and 2014 (e.g., in accordance with a TD-LTE MIMO antennas diversity requirement), at the same time, the wireless communication device 300 sends TDD UL data to a network entity 200 (e.g., a network base station 1214) via the first TDD link (e.g., Link A) using the first TDD RAT (e.g., TD-SCDMA).

Next, at decision block 2018, a determination is made (e.g., by a network entity 200 and/or the wireless communication device 300) as to whether all TDD UL and DL transmission(s) are complete. In a scenario, where a determination is made that all TDD UL and DL transmission(s) are complete, at decision block 2018, the process proceeds to operation block 2022, where all corresponding TDD data transmissions for the wireless communication device 300 are stopped. Alternatively, in a scenario, where a determination is made that all TDD UL and DL transmission(s) are not complete, at decision block 2018, the process proceeds to operation block 2020, where the wireless communication device 300 (and the network) can perform another TDD state switch (e.g., using the RF frontend switch 1206). Thereafter, the procedure loops back to the simultaneous Tx/Rx TDD transmission of operation blocks 2004, 2006 and 2008, such that further TDD UL and DL data transmissions are performed for the wireless communication device 300.

Figure 13:
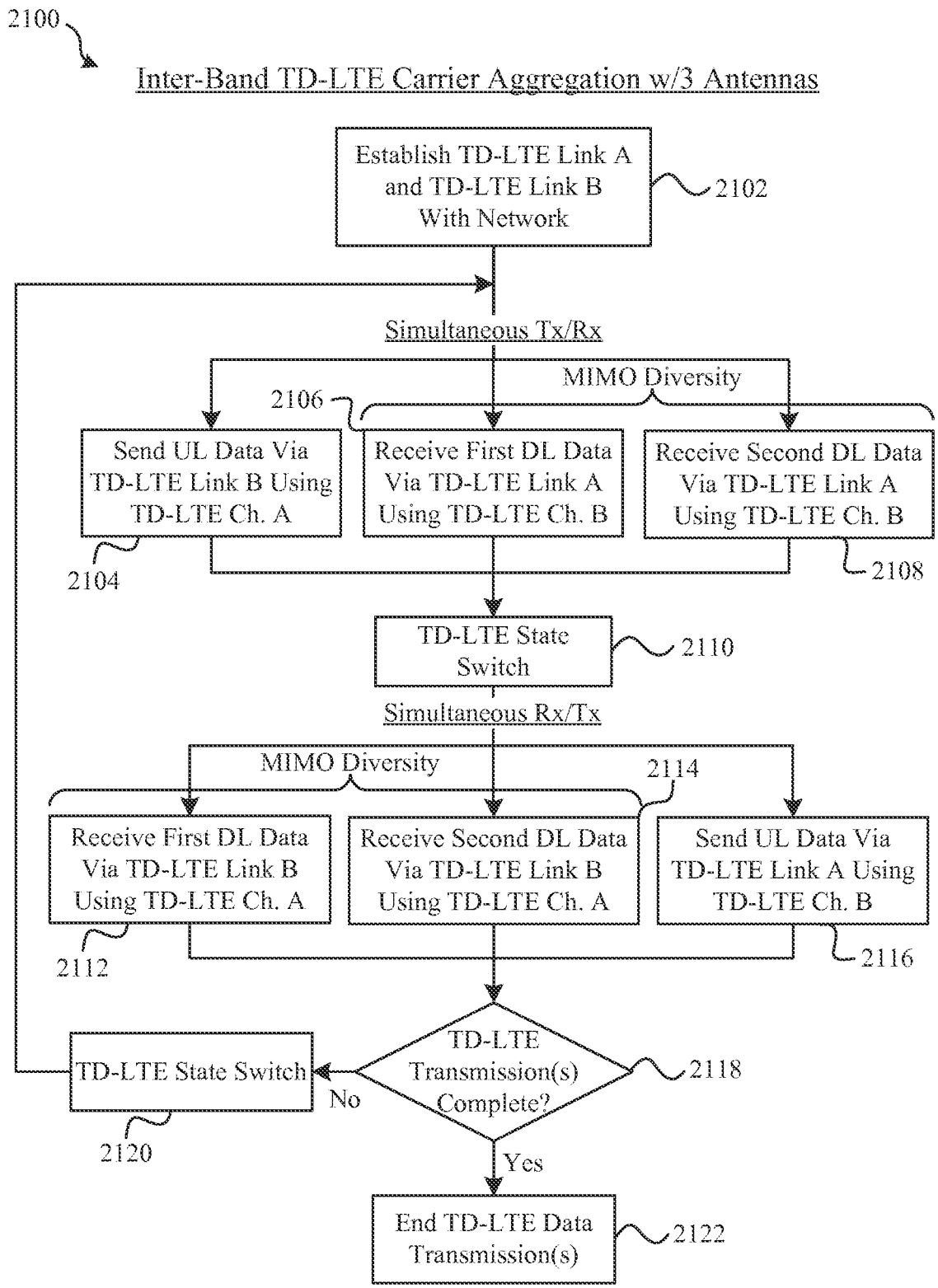
FIG. 13 depicts a flow diagram of a procedure for Inter-Band TD-LTE carrier aggregation, in accordance with various embodiments of the disclosure.

FIG. 13 depicts a flow diagram showing various procedures 2100 for performing Inter-Band TD-LTE carrier aggregation for a UE 300, in accordance with various embodiments of the disclosure. In this regard, it should be understood that any or all of the procedures 2100 depicted in FIG. 13 may be associated with a method, or methods, that can be implemented by the execution of computer-executable instructions (e.g., computer program code) stored in a non-transitory computer-readable memory 306 of a UE device 300, optionally in conjunction with the execution of computer-executable instructions (e.g., computer program code) stored in a non-transitory computer-readable memory 206 of an eNodeB 200 and/or any other common telecommunication network entity, such as an LTE MME.

Initially, at operation block 2102 a first (e.g., Link A 1512 of FIG. 9A) and a second TD-LTE communication link (e.g., Link B 1510) may be established for a UE 300. Next, at operation block 2104, the UE 300 may send TD-LTE UL data to a network entity 200 (e.g., an eNodeB 1514) via the second TD-LTE link (e.g., Link B 1510) using a first TD-LTE channel (ChA, e.g., channel B38), at the same time, the UE 300 receives first and second TD-LTE DL data from the network entity 200 via the first TD-LTE link (Link A 1508) using a second TD-LTE channel (ChB, e.g., channel B41), at operation blocks 2106 and 2108 (e.g., in accordance with a TD-LTE MIMO antennas diversity requirement).

Subsequently, at operation block 2110, the UE 300 (and the network) can perform a TD-LTE state switch (e.g., using the RF frontend switch 1506). Then, the UE device 300 can receive first and second TD-LTE DL data from a network entity 200 via the second TD-LTE link (e.g., Link B 1602) using the second TD-LTE channel (ChB, e.g., channel B41), at operation blocks 2112 and 2114 (e.g., in accordance with a TD-LTE MIMO antennas diversity requirement), at the same time, the UE 300 sends TD-LTE UL data to a network entity 200 via the first TD-LTE link (e.g., Link A 1604) using the first TD-LTE channel (ChA, e.g., channel B38).

Next, at decision block 2118, a determination is made (e.g., by a network entity 200 and/or the UE 300) as to whether all TD-LTE UL and DL transmission(s) are complete. In a scenario where a determination is made that all TD-LTE UL and DL transmission(s) are complete, at decision block 2118, the process proceeds to operation block 2122, where all corresponding TD-LTE data transmissions for the wireless communication device 300 are stopped. Alternatively, in a scenario, where a determination is made that all TD-LTE UL and DL transmission(s) are not complete, at decision block 2118, the process proceeds to operation block 2120, where the UE 300 (and the network) can perform another TDD state switch (e.g., using the RF frontend switch 1506). Thereafter, the procedure loops back to the simultaneous Tx/Rx TD-LTE transmission of operation blocks 2104, 2106 and 2108, such that further TD-LTE UL and DL data transmissions are performed for the UE 300.

It should be understood that the various aspects, embodiments, implementations or features of the described embodiments can be used separately or in any combination. Various aspects of the described embodiments can be implemented by software, hardware or a combination of hardware and software. The described embodiments can also be embodied as computer-executable code/instructions that can be stored on a non-transitory computer-readable medium. The non-transitory computer-readable medium can be any data storage device that can store data, which can thereafter be read by a computer system. Examples of such a computer-readable medium include a read-only memory (ROM), a random-access memory (RAM), a compact disc (CD), a digital versatile disc (DVD), a hard disk drive (HDD), magnetic tape, or another optical data storage device.

The foregoing description, for purposes of explanation, used specific nomenclature to provide a comprehensive understanding of the described embodiments. However, it should be apparent to one skilled in the art that all of the specific details are not required in order to practice the described embodiments. Thus, the foregoing descriptions of specific embodiments are presented for purposes of illustration and description. They are not intended to be exhaustive, or to limit the described embodiments to the precise forms disclosed. It will be apparent to one of ordinary skill in the art that many modifications and variations are possible in view of the above teachings.

What is claimed is:

1. A method for performing simultaneous time division duplex (TDD) communications with a mobile device, the method comprising:
by the mobile device:
establishing a first TDD communication link with a wireless network;
establishing a second TDD communication link with the wireless network; and
alternating between a first configuration and a second configuration in consecutive sequential time periods corresponding to subframe transmission time intervals (TTIs) of time-division Long Term Evolution (TD-LTE) data frames while listening for a Global System for Mobile (GSM) paging communication addressed to the mobile device;
wherein:
during first time periods, the first configuration comprises configuring wireless circuitry including a transceiver and switchable radio frequency front end coupled to multiple antennas to:
send TDD uplink data to the wireless network via the first TDD communication link through a first antenna of the multiple antennas; and
receive first TDD downlink data from the wireless network via the second TDD communication link through a second antenna of the multiple antennas; and
during second time periods, the second configuration comprises reconfiguring the wireless circuitry to:
receive second TDD downlink data from the wireless network via the first TDD communication link through the first and second antennas; and
refrain from transmitting uplink data to the wireless network via the second TDD communication link,
wherein a portion of the TDD uplink data is transmitted from the mobile device at the same time a portion of the first TDD downlink data is received at the mobile device during the first time periods, and
wherein the first TDD downlink data is the GSM paging communication, the TDD uplink data is a TD-LTE data transmission to the wireless network, the second TDD downlink data is a TD-LTE data transmission from the wireless network, and communication by the wireless network of the GSM paging communication to the mobile device is coordinated to align with TDD uplink subframe TTIs of the TD-LTE data frames.

2. The method of claim 1, wherein the second TDD downlink data is received at the mobile device in multiple coordinated data transmissions using Long Term Evolution (LTE) multiple-input and multiple-output (MIMO) antenna diversity.

3. The method of claim 1, further comprising:
responsive to receipt of the GSM paging communication addressed to the mobile device:
establishing a GSM voice call at the mobile device via the second TDD communication link; and
discontinuing TD-LTE uplink and downlink communication via the first TDD communication link during the GSM voice call.

4. The method of claim 1, wherein the first TDD communication link is established using a first radio communication channel and the second TDD communication link is established using a second radio communication channel having different assigned radio frequency spectrum than the first radio communication channel.

5. A wireless communication device comprising:
wireless circuitry including a radio transceiver configured to support simultaneous time division duplex (TDD) communications and a switchable radio frequency front end coupled to multiple antennas;
one or more processors; and
a storage device storing computer-executable instructions that, when executed by the one or more processors, causes the wireless communication device to:
establish a first TDD communication link and a second TDD communication link with a wireless network; and
alternate between a first configuration and a second configuration in consecutive sequential time periods corresponding to subframe transmission time intervals (TTIs) of time-division Long Term Evolution (TD-LTE) data frames while listening for a Global System for Mobile (GSM) paging communication addressed to the wireless communication device;
wherein:
during first time periods, the first configuration comprises configuring the wireless circuitry to:
send TDD uplink data to the wireless network via the first TDD communication link through a first antenna of the multiple antennas; and
receive first TDD downlink data from the wireless network via the second TDD communication link through a second antenna of the multiple antennas; and
during second time periods, the second configuration comprises reconfiguring the wireless circuitry to:
receive second TDD downlink data from the wireless network via the first TDD communication link through the first and second antennas; and
refrain from transmitting uplink data to the wireless network via the second TDD communication link,
wherein the TDD uplink data is transmitted from the wireless communication device at the same time the first TDD downlink data is received at the wireless communication device during the first time periods, and
wherein the first TDD downlink data is the GSM paging communication, the TDD uplink data is a time-division Long Term Evolution (TD-LTE) data transmission to the wireless network, the second TDD downlink data is a TD-LTE data transmission from the wireless network, and communication by the wireless network of the GSM paging communication to the mobile device is coordinated to align with TDD uplink subframe TTIs of the TD-LTE data frames.

6. The wireless communication device of claim 5, wherein the first TDD communication link is established using a first radio communication channel and the second TDD communication link is established using a second radio communication channel having different assigned radio frequency spectrum than the first radio communication channel.

7. The wireless communication device of claim 5, wherein the second TDD downlink data is received at the wireless communication device in multiple coordinated data transmissions using Long Term Evolution (LTE) multiple-input and multiple-output (MIMO) antenna diversity.

8. The wireless communication device of claim 5, wherein execution of the computer-executable instructions by the one or more processors further cause the wireless communication device to:
    responsive to receipt of the GSM paging communication addressed to the wireless communication device:
    establish a GSM voice call via the second TDD communication link; and
    discontinue TD-LTE uplink and downlink communication via the first TDD communication link during the GSM voice call.

9. A non-transitory storage device storing computer-executable instructions that, when executed by one or more processors, causes a wireless communication device to:
    establish a first time division duplex (TDD) communication link and a second TDD communication link with a wireless network; and
    alternate between a first configuration and a second configuration in consecutive sequential time periods corresponding to subframe transmission time intervals (TTIs) of time-division Long Term Evolution (TD-LTE) data frames while listening for a Global System for Mobile (GSM) paging communication addressed to the wireless communication device;
    wherein:
    during first time periods, the first configuration comprises configuring wireless circuitry including a transceiver and switchable radio frequency front end coupled to multiple antennas to:
    send TDD uplink data to the wireless network via the first TDD communication link through a first antenna of the multiple antennas; and
    receive first TDD downlink data from the wireless network via the second TDD communication link through a second antenna of the multiple antennas; and
    during second time periods, the second configuration comprises reconfiguring the wireless circuitry to:
    receive second TDD downlink data from the network via the first TDD communication link through the first and second antennas; and
    refrain from transmitting uplink data to the network via the second TDD communication link,
    wherein a portion of the TDD uplink data is transmitted from the wireless communication device at the same time a portion of the first TDD downlink data is received at the wireless communication device during the first time periods, and
    wherein the first TDD downlink data is the GSM paging communication, the TDD uplink data is a time-division Long Term Evolution (TD-LTE) data transmission to the wireless network, the second TDD downlink data is a TD-LTE data transmission from the wireless network, and communication by the wireless network of the GSM paging communication to the mobile device is coordinated to align with TDD uplink subframe TTIs of the TD-LTE data frames.

10. The non-transitory storage device of claim 9, wherein the second TDD downlink data is received in multiple coordinated data transmissions using Long Term Evolution (LTE) multiple-input and multiple-output (MIMO) antenna diversity.

11. The method of claim 1, wherein:
    the second TDD downlink data comprises a first TD-LTE data transmission and a second TD-LTE data transmission;
    the mobile device receives the first TD-LTE data transmission at the first antenna of the multiple antennas via the first TDD communication link; and
    the mobile device receives the second TD-LTE data transmission at the second antenna of the multiple antennas via the first TDD communication link.

12. The wireless communication device of claim 5, wherein:
    the second TDD downlink data comprises a first TD-LTE data transmission and a second TD-LTE data transmission;
    the wireless communication device receives the first TD-LTE data transmission at the first antenna of the multiple antennas via the first TDD communication link; and
    the wireless communication device receives the second TD-LTE data transmission at a second antenna of the multiple antennas via the first TDD communication link.

13. The non-transitory storage device of claim 9, wherein:
    the second TDD downlink data comprises a first TD-LTE data transmission and a second TD-LTE data transmission;
    the wireless communication device receives the first TD-LTE data transmission at the first antenna of the multiple antennas via the first TDD communication link; and
    the wireless communication device receives the second TD-LTE data transmission at the second antenna of the multiple antennas via the first TDD communication link.

14. The non-transitory storage device of claim 9, wherein the execution of the computer-executable instructions by the one or more processors further cause the wireless communication device to:
    responsive to receipt of the GSM paging communication addressed to the wireless communication device:
    establish a GSM voice call via the second TDD communication link; and
    discontinue TD-LTE uplink and downlink communication via the first TDD communication link during the GSM voice call.

* * * * *